(12) United States Patent
Deshmukh et al.

(10) Patent No.: US 12,395,524 B2
(45) Date of Patent: Aug. 19, 2025

(54) MITIGATION OF A DENIAL OF SERVICE ATTACK IN A DEVICE PROVISIONING PROTOCOL (DPP) NETWORK

(71) Applicant: HEWLETT PACKARD ENTERPRISE DEVELOPMENT LP, Houston, TX (US)

(72) Inventors: Amogh Guruprasad Deshmukh, Santa Clara, CA (US); Daniel N. Harkins, Santa Clara, CA (US); Zhijun Ren, Beijing (CN); Guangning Qin, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 273 days.

(21) Appl. No.: 17/968,310

(22) Filed: Oct. 18, 2022

(65) Prior Publication Data

US 2024/0129337 A1    Apr. 18, 2024

(51) Int. Cl.
*H04L 9/40* (2022.01)

(52) U.S. Cl.
CPC ...... *H04L 63/1458* (2013.01); *H04L 63/0442* (2013.01); *H04L 63/1416* (2013.01); *H04L 2463/141* (2013.01)

(58) Field of Classification Search
CPC ............ H04L 63/1458; H04L 63/0442; H04L 63/1416; H04L 2463/141; H04L 9/40; H04L 63/083; H04W 12/04; H04W 12/068; H04W 12/126
See application file for complete search history.

(56) References Cited

U.S. PATENT DOCUMENTS

| | | | |
|---|---|---|---|
| 9,094,445 B2 | 7/2015 | Moore et al. | |
| 10,116,692 B2 | 10/2018 | Huston, III et al. | |
| 10,728,280 B2 | 7/2020 | Reddy et al. | |
| 10,911,300 B2 | 2/2021 | Stationwala et al. | |
| 2014/0075567 A1 | 3/2014 | Raleigh et al. | |
| 2016/0112406 A1* | 4/2016 | Bugrov | H04L 63/102 726/10 |

(Continued)

OTHER PUBLICATIONS

Wifi Alliance, "Wi-Fi Easy Connect™ Specification Version 2.0", 2020, 226 pages.

*Primary Examiner* — Joe Chacko
(74) *Attorney, Agent, or Firm* — Sheppard Mullin Richter & Hampton LLP

(57) ABSTRACT

Systems and methods are provided for mitigating denial-of-service attacks that can disrupt onboarding internet-of-things (IoT) devices onto a network and ensuring legitimate IoT devices are onboarded. Example implementations include receiving, at an access point (AP) from a device, a chirp signal comprising a hash of data including a first public key of an IoT device. Upon verification of the first public key, the AP generates a context based on a first public key received from the authenticator. The context comprises information for onboarding the IoT device without subsequent communications between the AP, configurator and the authenticator. The AP can use the context to create and transmit authentication authorization requests responsive to chirp signals. In some examples, a chirp table can be created by a configurator for tracking severing APs. The chirp table can be utilized in provisioning APs for future chirp signals as needed.

16 Claims, 12 Drawing Sheets

(56) References Cited

U.S. PATENT DOCUMENTS

| | | | |
|---|---|---|---|
| 2018/0109418 A1* | 4/2018 | Cammarota | H04W 12/50 |
| 2019/0166495 A1 | 5/2019 | Goeringer et al. | |
| 2019/0306710 A1* | 10/2019 | Cammarota | H04W 12/06 |
| 2020/0162904 A1 | 5/2020 | Jiang et al. | |
| 2020/0336898 A1 | 10/2020 | Jiang et al. | |
| 2021/0385778 A1* | 12/2021 | Ahn | H04W 48/08 |
| 2023/0164671 A1* | 5/2023 | Vig | H04W 48/10 370/338 |

* cited by examiner

US 12,395,524 B2

MITIGATION OF A DENIAL OF SERVICE ATTACK IN A DEVICE PROVISIONING PROTOCOL (DPP) NETWORK

An Internet of Things (IoT) device is a hardware device that connects to the Internet to transmit data to other devices. Examples of IoT devices may include but are not limited to, sensors, actuators, gadgets, appliances, or machines that have support for Internet connectivity. IoT devices are generally provisioned with an internet protocol (referred hereafter as "IP") address to connect to the Internet. Provisioning and connecting IoT devices to a wireless network can be performed using a protocol such as the Device Provisioning Protocol (DPP). DPP is a mechanism promulgated by the Wi-Fi Alliance, a worldwide network of companies that aims to drive global Wi-Fi adoption. Once connected to the Internet, the IoT devices are capable of transferring data and/or receiving control signals over a wireless network (e.g., a Wi-Fi network).

BRIEF DESCRIPTION OF THE DRAWINGS

The present disclosure, in accordance with one or more various implementations, is described in detail with reference to the following figures. The figures are provided for purposes of illustration only and merely depict typical or example implementations.

FIG. 3 illustrates a message flow diagram 300 depicting a sequence of operations of an example denial-of-service (DoS) attack.

Figure 1:
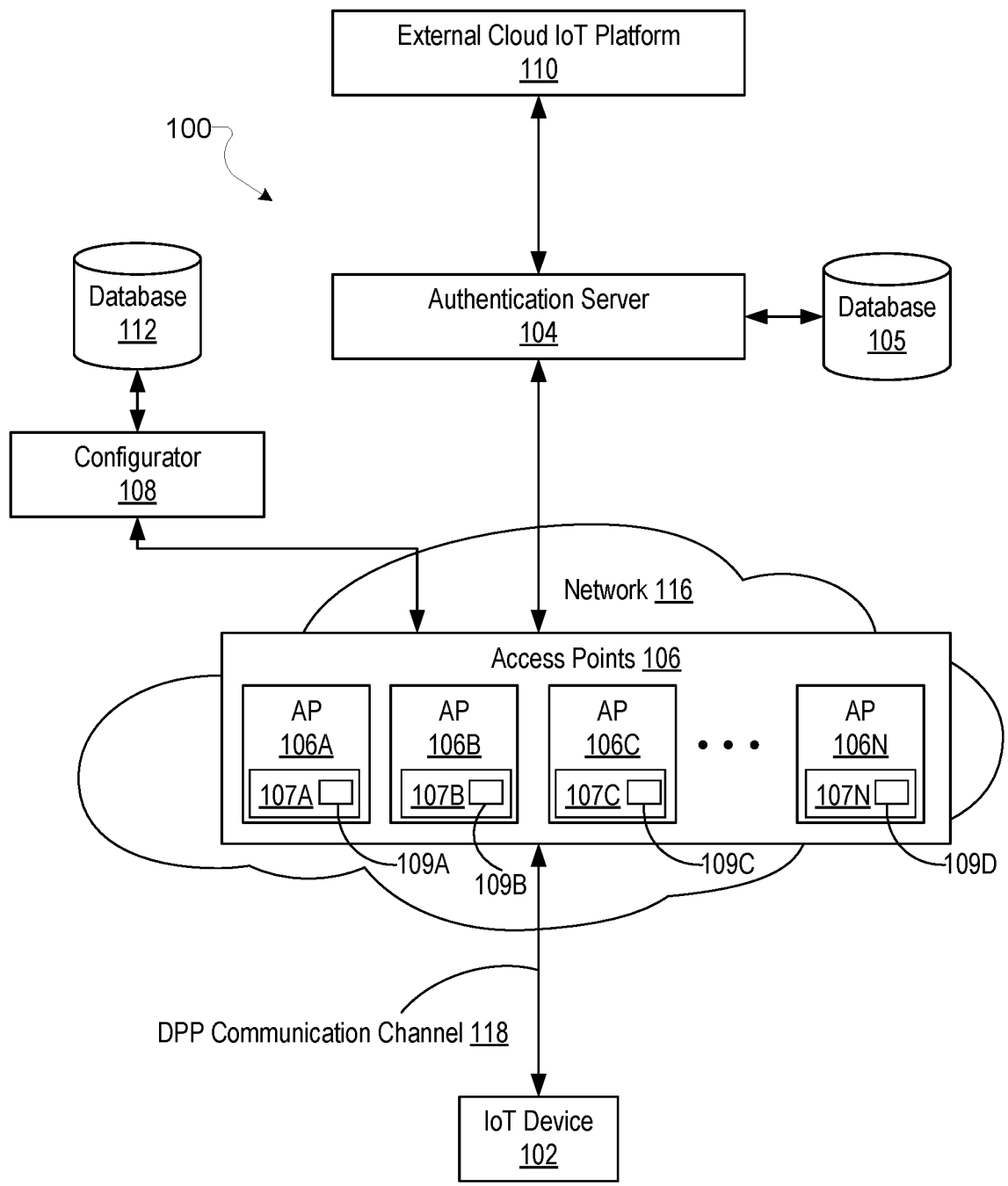
FIG. 1 is a system for enabling onboarding of an IoT device to a wireless network using device provisioning protocol (DPP) in accordance with the implementations disclosed herein.

The figures are not exhaustive and do not limit the present disclosure to the precise form disclosed.

DETAILED DESCRIPTION

IoT device provisioning is performed when an IoT device (e.g., a sensor or an appliance) wishes to establish network connectivity. The IoT device needs to be authenticated and configured to join a network. Once authenticated and configured, the IoT device can connect to a wireless network (e.g., a Wi-Fi network) and perform any subsequent onboarding, such as connecting to a cloud platform.

IoT devices may have limited or non-existent user interfaces, resulting in several challenges in the onboarding of the IoT devices to a Wi-Fi network. Generally, a user has to manually connect and configure an IoT device from a smartphone or a separate computer. In some cases, the IoT device may also require a customer service representative from a wireless network provider to manually configure the IoT device. This type of manual provisioning of the IoT device is not desirable for provisioning a multitude of IoT devices as this would require several man-hours.

Further, in many cases the provisioning mechanism is insecure, and there may be a chance of compromise of data in the IoT device or at the IoT cloud platform when the IoT device connects to the wireless network. Hence, a secure, fast, and user-friendly mechanism that provisions an IoT device with a security credential and then connect the IoT device to a wireless network using the security credential is desirable.

In accordance with aspects of the present disclosure, examples for connecting an IoT device to a wireless network are presented. In some examples, the provisioning of the IoT device and connecting the IoT device to the wireless network, as described herein, is based on a Device Provisioning Protocol (DPP).

DPP overcomes challenges in onboarding IoT devices by facilitating provisioning of unprovisioned devices using DPP messages communicated with a configurator via an access point (AP) in the wireless network. The configurator is an entity that provisions the IoT device with a security credential. The configurator establishes trust in a public bootstrapping key of the IoT device. The AP may act as an agent (i.e., a proxy device) of the configurator and communicate with an authentication server to acquire a public bootstrapping key of the IoT device. The AP can then authenticate and authorize the IoT device, using the public bootstrapping key, before connecting the IoT device to the wireless network. The IoT device may be connected via the AP to the wireless network based on network permissions.

In some examples, provisioning of an unprovisioned IoT device can be initiated by a DPP presence announcement message (also referred to as a chirp signal or chirp) sent to the AP by an unprovisioned IoT device. However, reliance on the DPP presence announcement message opens up the possibility of a denial-of-service (DoS) attack, through bombardment of DPP presence announcement messages onto the network, that can disrupt the DPP network. A DPP presence announcement message contains a hash of data that includes a public bootstrapping key of the IoT device. The DPP presence announcement message, including the hash, can be spoofed by attacking devices, even if such devices do not know the IoT device's bootstrapping key. Conventionally, an AP responds to the first received DPP presence announcement message by sending a DPP authorization request message, which includes the hash from the DPP presence announcement, to the authentication server. The authentication server maintains a database of chirp hashes including public bootstrapping keys of all IoT devices, and checks the database to verify the chirp hash. If a match is found, the authentication server sends the AP the public bootstrapping key of the IoT device. From the public bootstrapping key, the AP constructs a DPP authentication request containing a hash of the public bootstrapping key obtained from the authentication server, which is transmitted to the IoT device to decode using the corresponding private key, which is known only by the IoT device, and construct an DPP authentication response to be sent to the AP. However, an attacking device may send a spoofed DPP presence announcement message, including the chirp hash, to which the AP responds with the DPP authorization request. The attacking device is unable to respond to the DPP authorization request since it does not know the private key of the IoT device; however, the AP does not respond to any subsequent DPP presence announcement messages (valid or not) until a timeout period has passed. Thus, a valid IoT device may be unable to be provisioned and onboarded. Furthermore, the attacking device may send multiple DPP presence announcement message that repeat the process and further delay, or possibly prevent, onboarding of the IoT device.

The technology of the present disclosure mitigates the above technical shortcomings of the conventional onboarding process by altering how the AP handles received DPP presence announcement messages. According to various implementations disclosed herein, an AP generates a context responsive to receiving a first public key (e.g., a public bootstrapping key according to various implementations) of an IoT device from the authentication server as part of provisioning the IoT device. For example, the AP may receive a chirp signal, including a hash of data including the first public key of the IoT device, and send a chirping event message (e.g., a message indicating a chirp signal has been received) to a configurator that provisions an AP (either the same or different AP) for onboarding the IoT device associated with the hashed public bootstrapping key included in the chirp signal. The serving AP then receives the first public key for onboarding the associated IoT device from the authentication server based on the chirp hash. The serving AP then generates a context for onboarding the IoT device corresponding to the first public key (e.g., the public bootstrapping key), which includes all necessary information to realize onboarding of the corresponding IoT device.

Note that the chirp signal may have been received by the AP from the corresponding IoT device or an attacking device that spoofed an earlier chirp signal from the IoT device. However, as noted above, the attacking device would not have the private bootstrapping key of the IoT.

The AP uses the context to respond to received chirp signals by generating an authentication request (e.g., a DPP authentication request according to various implementations), which includes the hash of the first public key, using the context. The AP communicates authentication requests to devices sending the chirp signals responsive to each of the received chirp signals. In the case of a chirp signal received from the IoT device, the IoT device can decode the authentication request using its first private key (e.g., private bootstrapping key) and send an authentication response to the AP (e.g., a DPP authentication response in the case of a DPP authentication request). The AP can then onboard the IoT device, for example, according to the DPP protocol. In the case of a chirp signal from an attacking device, the attacking device is unable to decode the hash, and unable to respond. Thus, by responding to each incoming chirp signal (instead of waiting a timeout period), an IoT device can be onboarded even if its chirp signal is simultaneously and/or subsequently being sent to the AP by an attacker. In some implementations, after the AP receives the authentication response from the IoT device, the AP ignores future chirp signals that include the hash of data including the public bootstrapping key of the IoT device by refraining from sending any further authentication requests and/or reporting chirping events.

In some cases, the attacking device or IoT device may frequency hop through multiple channels, each serviced by a different AP. This frequency hopping can include broadcasting chirp signals on different channels, which are received by various APs that each of send a corresponding chirp event to the configurator. The configurator provisions one of the APs (referred to herein as a serving AP) as serving the chirp signal by sending a chirp accept message, while sending a chirping event reject message to other APs, if applicable. In single AP deployments of DPP the problem remains as the AP can be flooded by an attacker with chirp messages from a multitude of MAC addresses and the AP is unable to determine the genuine device. However, according to various implementations disclosed herein, each AP that receives a chirp signal creates a context for the chirp signal through communications with the authentication server, as described above. Thus, while a serving AP serves the IoT device (and ignores further chirp signals), any other AP can similarly ignore future chirp signals from either attacking devices and/or the IoT device. According to an example implementation, the configurator can store a chirp table (sometimes referred to as DPP chirp table in the context of a DPP messages) for tracking which AP is a serving AP, has been a serving AP, and has a context stored therein. The chirp table can be utilized in serving APs for future chirp signals as needed.

Some implementations disclosed herein can be configured to operate in conjunction with or under the purview of a network insight system that can be cloud-based. The configurator according to some implementations may be part of a cloud-based network insight system, and may establish wireless connections to/from the network insight system, which in turn may wirelessly connect to a network insight dashboard system. That is, the network insight system may be a "backend" system connected to or including the configurator, and the network insight dashboard system may be a "frontend" system. The backend network insight system may communicate with the configurator and/or APs to receive data and metrics for monitoring and tracking performance of the network. The network insight dashboard system may receive information or data gleaned by the backend network insight system regarding one or more aspects of a network in which the APs as a result of the monitoring or testing aspects of the network, applications running on the network, etc. A user, such as a network administrator, may then view or obtain such information or data via the network insight dashboard system, such as detecting DoS attacks on the network responsive to detecting conditions in the network indicative of a DoS attack. Parameters (e.g., operating parameters) or information regarding configuration for the network insight system to detect such conditions may be set forth using the network insight dashboard system.

While the following description is made with reference to DPP messages, the scope of the present disclosure should not be construed as limited to the specific protocols and/or messages of DPP. Reference to DPP messages is used as a specific example in which the disclosed technology can be used, for example, in mitigating a potential source of DoS attacks that are possible in DPP.

FIG. 1 is a system 100 for enabling onboarding of IoT devices to a wireless network 116 using DPP in accordance with the implementations disclosed herein. In some examples, the system 100 may include an IoT device 102, an authentication server 104, one or more access points (APs), such as APs 106A, 106B, 106C . . . 106N, (hereinafter collectively referred to as APs 106), and a configurator 108. The APs 106 and the configurator 108 may communicate with each other via a wired or wireless network. In some implementations, the configurator 108 and AP 106 may be co-resident in the same physical enclosure. For example, the configurator 108 and/or AP 106 may be logical entities or functions described by the service they provide, and the physical representation, or network deployment, of these logical entities or functions need not be constrained to a physical device. During an initial phase, when the IoT device 102 is not provisioned to access the wireless network 116, the IoT device 102 may communicate with the configurator 108 using DPP messages via the APs 106. Once provisioned, the IoT device 102 may be connected to the wireless network 116.

In an example implementation, the system 100 may be part of a distributed setting, such as a university network or an enterprise network. In some instances, certain enterprise networks consider IoT devices as untrusted and restrict network access. Such restrictions may limit the types of applications the enterprise may implement with IoT devices. In some examples, DPP-based provisioning of the IoT device 102 by the authentication server 104, as described herein, may ensure authentication and configuration of the IoT device 102 securely. The DPP-based provisioning by the authentication server 104 may allow users to define access policies for the IoT device 102 before connecting it to the wireless network 116. In various implementations, the configurator 108 and the authentication server 104 may be part of a cloud platform associated with an enterprise. The term "network access" as used herein may refer to include access to a wireless network such as the wireless network 116.

Examples of the wireless network 116 may include, but are not limited to, an Internet Protocol (IP) or non-IP-based, wireless LAN (WLAN), metropolitan area network (MAN), wide area network (WAN), a storage area network (SAN), a personal area network (PAN), a cellular communication network, and the Internet. In some examples, the wireless network 116 may include the APs 106 to facilitate data communication. Communication over the wireless network 116 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the wireless network 116 may be enabled via wireless (e.g., Wi-Fi®, cellular communication, satellite communication, Bluetooth, etc.) communication technologies. In some examples, the wireless network 116 may be enabled via private communication links including, but not limited to, communication links established via Bluetooth, cellular communication, optical communication, radio frequency communication, and the like.

The IoT device 102 shown in FIG. 1 may be configured with a security credential to access the wireless network 116 by communicating data and DPP messages to the configurator 108 via one or more of the APs 106, in accordance with some examples. Examples of the IoT device 102 may include, but are not limited to, a location tag, an activity monitor, a connected thermostat, a monitoring camera, a sensor device, or any electronic or mechanical device that supports Internet connectivity. Although, a single IoT device 102 is depicted in the system 100 of FIG. 1, the system 100 may include more than one IoT device without limiting the scope of the present disclosure.

Further, in some examples, the authentication server 104 may be implemented as an independent server, may be part of a cloud, or may be co-resident with another logical entity. In some other examples, the authentication server 104 may be implemented as a hardware system/device, such as but not limited to, a computer system, a mobile device, a blade server, a computer appliance, a workstation, a storage system, or a converged or a hyperconverged system. In certain other examples, the authentication server 104 may be implemented as a software resource, such as, but not limited to, a software application, a virtual machine (VM), a container, a containerized application, or a pod. During operation, the authentication server 104 may facilitate authentication and/or authorization of the IoT device 102 and manage the onboarding of the IoT device 102 using DPP. The DPP is a standardized protocol that allows the IoT device 102 to be provisioned for network access using a controller (e.g., the configurator 108).

In some examples, the authentication server 104 may maintain bootstrapping information of the IoT device 102 to facilitate authentication and/or authorization of the IoT device 102 and manage the onboarding of the IoT device 102 to the wireless network 116. The term "bootstrapping information" as used herein may refer to information such as, but not limited to, a public bootstrapping key of the IoT device 102. In some examples, during manufacturing, IoT device vendors may embed bootstrapping key pairs in the IoT device. The public bootstrapping key of the IoT device 102 may be registered with an external cloud IoT platform 110 or it may be acquired by other means. In some examples, the authentication server 104 may query the external cloud IoT platform 110, for obtaining the bootstrapping information of the IoT device 102. In response, the authentication server 104 may receive the public bootstrapping key from the external cloud IoT platform 110. In some examples, bootstrapping information may also include an Extended Service Set Identification (ESSID) of the wireless network 116.

In some examples, the authentication server 104 may include a database 105 for storing the bootstrapping information of the IoT device 102. The database 105 may be periodically synchronized with the external cloud IoT platform 110 for receiving and updating the bootstrapping information. In some examples, where the bootstrapping information of the IoT device 102 is not integrated into the external cloud IoT platform 110, the bootstrapping information of the IoT device 102 may be received by out-of-band means. For example, the bootstrapping information may be present on the IoT device 102 in the form of an indicia (e.g., a Quick Response (QR) code). A user may scan the indicia using a mobile application to receive the public bootstrapping key of the IoT device 102. The mobile application may update the public bootstrapping key of the IoT device 102 at the authentication server 104.

Furthermore, in some examples, the APs 106 may be part of a wireless local area network (WLAN) and may provide wireless services to the IoT device 102 in an area covered by the respective APs 106. Examples of the APs 106 may include but are not limited to, routers, network switches, network gateways, and the like. In some examples, one of the APs 106 may act as a bridge for connecting an IoT device, such as the IoT device 102 to the wireless network 116. The APs 106 may be distributed throughout an area in which network access is desired. Accordingly, the IoT device 102 may be deployed within the area serviced by one or more of the APs 106.

In some examples, the configurator 108 may provision the IoT device 102 with a security credential. In some examples, the configurator 108 may be implemented using a processor or a microcontroller and/or any other electronic component, or a device or system that may facilitate various compute, data storage, and/or data processing. In certain other examples, the configurator 108 may be deployed as a software resource, for example, a virtual machine (VM), a container, a containerized application, or a pod. The configurator 108 may establish trust in the public bootstrapping key of the IoT device 102 and authenticate the IoT device 102 using a DPP authentication protocol. More details about authentication using DPP is described in conjunction with FIG. 2.

During operation, the configurator 108 may select an AP as a serving AP to perform the DPP authentication protocol and DPP configuration control from the APs 106 in the wireless network 116. The serving AP may be selected based on the Received Signal Strength Indicator (RSSI) and/or a current load of the APs 106. The RSSI may indicate the radio frequency (RF) signal strength of the wireless network 116 at the respective APs 106. In certain systems, when there is a high density of the APs 106 in the system 100, the configurator 108 may select a specific AP for configuring the IoT device 102 with a connector (i.e. security credential). For example, in a high-density deployment of APs at a warehouse, the configurator 108 may select an AP present at an onboarding location in the warehouse to assist with the provisioning of the connector for the IoT device 102. As will be appreciated, the selection of an appropriate AP as the agent of the configurator 108 (e.g., serving AP) may reduce the time required for onboarding the IoT device 102 to the wireless network 116.

For illustration purposes, the AP 106B may be selected by the configurator 108, based on one or more of the above-mentioned criteria. Accordingly, the AP 106B is hereinafter referred to as serving AP 106B. The terms "AP 106B" and "serving AP 106B" are used interchangeably hereinafter and refer to an AP selected by the configurator 108. The serving AP 106B may act as an agent of the configurator 108 for authenticating and configuring the IoT device 102 to access the wireless network 116. The authentication and configuration of the IoT device 102 are performed using the DPP authentication protocol and a DPP configuration protocol respectively. In particular, the serving AP 106B aids in exchanging DPP messages and information between the IoT device 102 and the configurator 108. The serving AP 106B communicates with the IoT device 102 over a DPP communication channel 118 between the IoT device 102 and the serving AP 106B. The DPP communication channel 118 is a dedicated communication medium established between the IoT device 102 and the serving AP 106B after verification of the public bootstrapping key of the IoT device 102. A single channel (or a small list of possible channels) may be pre-defined as the DPP communication channel 118 by the APs 106. The serving AP 106B may obtain the DPP messages on the DPP communication channel 118. Serving AP 106B may act as a proxy device for transmitting DPP messages between the IoT device 102 and the configurator 108. The serving AP 106B may act as an authenticator to authenticate the IoT device 102 on behalf of the authentication server 104.

In some examples, the APs 106 may include respective databases 107 for storing a context 109 for onboarding IoT devices. The databases 107 may be periodically updated with the authentication server 104 for receiving and updating bootstrapping information for onboarding a corresponding IoT device. For example, as part of the DPP authentication protocol, the authentication server 104 communicates bootstrapping information to the serving AP 106B. Serving AP 106B generates a context 109B for onboarding an IoT device corresponding to the public bootstrapping key and stores the context 109B in database 107B. The context 109B includes all necessary information for provisioning and onboarding of the corresponding IoT device. For example, the context 109B can be indexed according to a chirp hash (e.g., SHA256("chirp"|$B_R$)) and include a public bootstrap key, Extended Service Set Identification (ESSID), AKM, a nonce, DPP protocol key, and capability (e.g., as a configurator or enrollee). The a public bootstrap key, SSID, and Authentication and Key Management (AKM, which is a field in 802.11 headers that lets the AP advertise what sort of security it is offering and allows devices to select one if more than one are offered) receive from the authentication server 104 and can be used to respond to a chirp hash and construct following DPP messages. The nonce, DPP protocol key, and capability can be generated by the AP 106B to respond to a chirp has and construct following DPP messages. Additionally, in some examples, bootstrapping information can be provided to one or more of the remaining APs 106 (e.g., non-serving APs) as part of the DPP authentication process, and each of the remaining APs 106 can similarly generate a context 109 for provisioning the IoT device corresponding to the bootstrapping information.

In some examples, the configurator 108 may include database 112 for storing a DPP chirp table (or multiple DPP chirp tables) for tracking APs serving IoT devices. The DPP chirp table may comprise entries for each IoT device that has accessed the network. The DPP chirp table can be provided for and updated so as to maintain a mapping of each IoT device with a current serving AP, any APs that have been previously been selected as a serving AP (referred to as served APs), and a listing of neighboring APs. The IoT device can be recorded according to an identifier, such as a hash of its public bootstrapping key. The configurator 108 may access the DPP chirp table to update and maintain the mapping for use in selecting a serving APs in the case of an IoT device (or any device) hopping between channel frequencies on one or more APs 106.

Figure 2:
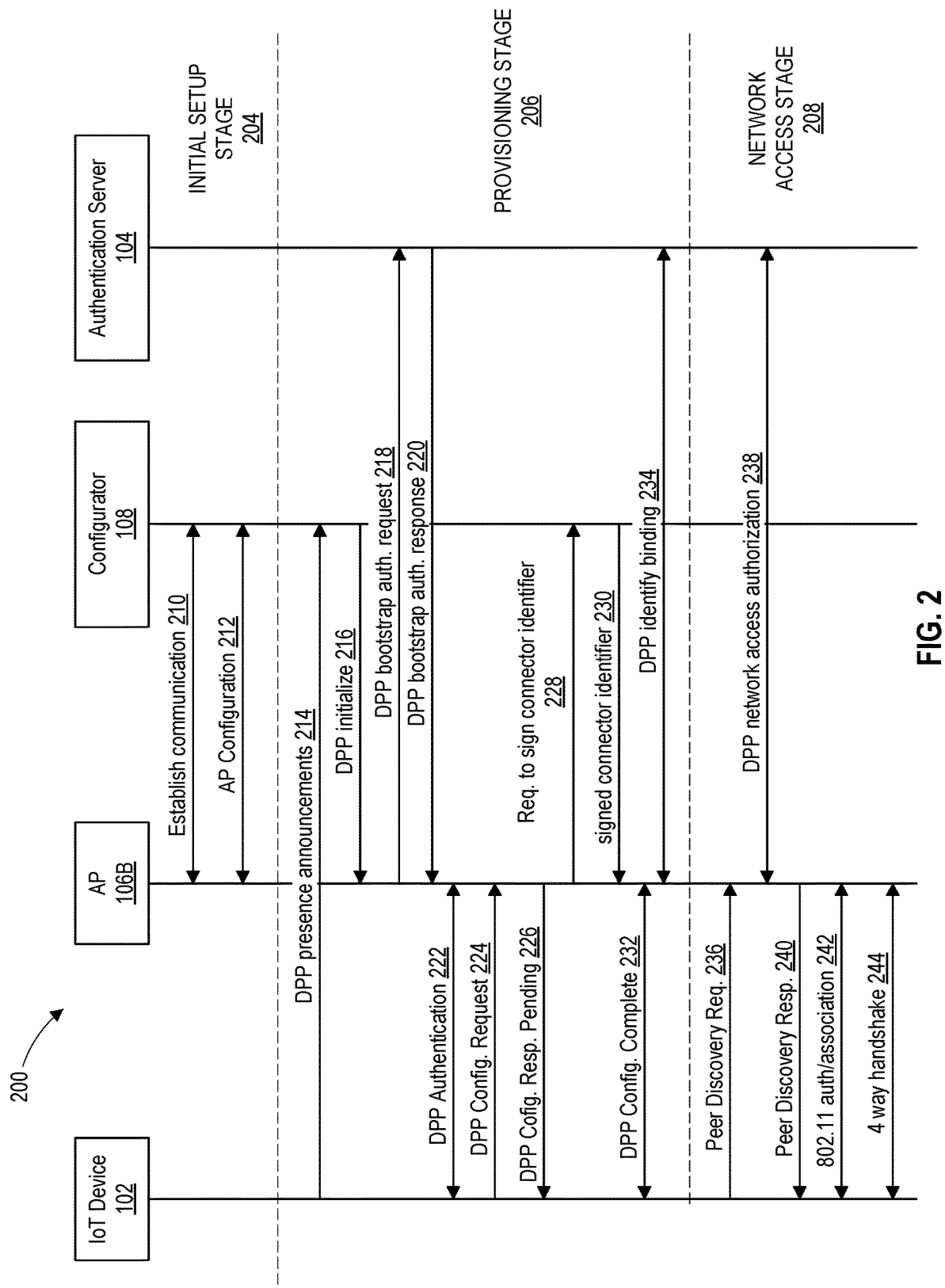
FIG. 2 illustrates a message flow diagram depicting a sequence of operations for onboarding of an IoT device.

FIG. 2 illustrates a message flow diagram 200 depicting a sequence of operations for onboarding of an IoT device to a wireless network. For illustration purposes, the message flow diagram 200 will be described with reference to the system 100 of FIG. 1. Thus, for example, the message flow diagram 200 provides a sequence of operations for enabling onboarding of the IoT device 102 to the wireless network 116. The message flow diagram 200 includes interactions between various entities, such as the IoT device 102, the authentication server 104, the configurator 108, and the serving AP 106B, in the system 100 in three stages, namely—an initial set-up stage 204, a provisioning stage 206 and a network access stage 208. While message flow diagram 200 is described with reference to the system 100, the scope of the present disclosure should not be construed as limited to the specifics (e.g., the numbers and arrangements of the APs 106, the configurator 108, the IoT device 102, and the authentication server 104) of the system 100 of FIG. 1.

During the initial set-up stage 204, the AP 106B may be configured to listen to DPP messages broadcasted over specific communication channels. Although the initial set-up stage 204 is described for the AP 106B, it will be appreciated that in certain deployments several APs in the wireless network 116 may be configured with respective DPP connectors to support DPP communication. For example, at step 210, the AP 106B and the configurator 108 may establish communication using a network (e.g., a wireless or wired network). Further, at step 212, the AP 106B may receive configuration information from the configurator 108. The configuration information may include a DPP connector of the AP 106B. The DPP connector may be a security credential provided by the configurator 108 to the AP 106B. The AP 106B may use the DPP connector to establish communication with the IoT device 102. In an example, the configuration information may include information related to the channels to be used by the AP 106B. Once configured, the AP 106B may advertise its ability to communicate via DPP. In an example, the IoT device 102 may scan the channels for advertisement from the AP 106B. Similarly, some or all of the APs 106 may be configured with respective DPP connectors and channel connectivity information to support DPP communication.

In the provisioning stage 206, the IoT device 102 may be authorized and provisioned with the security credential required for network access. The IoT device 102 may scan, upon powering-on or at periodic intervals, all supported channels, and broadcast DPP presence announcement messages periodically. In some implementations, IoT device 102 broadcasts a DPP presence announcement message at a fixed periodic intervals (e.g., 2 seconds in some examples) while hopping between multiple channel frequencies on one or more APs 106. In one example, the DPP presence announcement messages may be carried by 802.11 action frames. The DPP presence announcement messages include a hash that contains data including a public bootstrapping key of the IoT device 102. The hash of the data including the public bootstrapping key may be the identifier of the IoT device 102. For example, the hash including the public bootstrapping key used in presence announcements is provided as SHA256("chirp"|$B_R$), where $B_R$ is the public bootstrapping key, "chirp" represents the additional data, and SHA256 is an example hash function applied to the data including the public bootstrapping key. Whereas the hash communicated in a DPP authentication request is provided as SHA256($B_R$). At step 214, the configurator 108 may receive a list of DPP presence announcement messages compliant with the DPP protocol from the IoT device 102 via the APs 106 in the wireless network 116. The DPP presence announcement messages transmitted by the IoT device 102 may be received by the APs 106, in which the DPP capability is configured during the initial set-up stage 204. The APs 106 may listen to the DPP presence announcement messages and may report a device chirping event to the configurator 108. The configurator 108 may monitor these device chirping events, and, at step 216, select an AP (for example, the AP 106B) to initialize DPP communication with the IoT device 102.

The DPP authentication protocol is initiated at the AP 106B after the trusted public bootstrapping key of the IoT device 102 is detected at step 214 by sending, at step 218, a DPP bootstrap authorization request to the authentication server 104 to check if the public bootstrapping key included in the hash of the data is registered. The serving AP 106B may generate the DPP bootstrap authorization request using the hash of the data including the public bootstrapping key present in the DPP presence announcement messages transmitted by the IoT device 102. For example, the AP 106B constructs a DPP bootstrap authorization request including SHA256("chirp"|$B_R$) received at step 214.

At step 220, the authentication server 104 may verify the public bootstrapping key, included in the hash of data received in the DPP bootstrap authorization request, is registered with the authentication server 104. For example, the authentication server 104 checks database 105 to verify that $B_R$ is registered. Based on successful verification of the bootstrapping information, the authentication server 104 may authenticate the IoT device 102 and verify that the IoT device 102 is an authorized (e.g., legitimate) device that may be provisioned to access the wireless network 116. To verify the public bootstrapping key of the IoT device 102, the authentication server 104 may synchronize with an external cloud IoT platform to receive the public bootstrapping key of the IoT device 102 at periodic intervals. If the public bootstrapping key of the IoT device 102 is registered with the external cloud IoT platform 110, the authentication server 104 may send a positive DPP bootstrap authorization response with bootstrapping information (e.g., the public bootstrapping key) of the IoT device 102 and the ESSID of the wireless network 116 to the serving AP 106B. In some examples, the serving AP 106B may receive the public bootstrapping key to authorize the IoT device 102. As the authentication server 104 maintains the public bootstrapping key of the IoT device 102, the repetitive bootstrapping for the same IoT device 102 can be avoided when the IoT device 102 disconnects and connects back to the system 100. Additionally, there is no or minimal human interaction involved in connecting/re-connecting the IoT device 102 to the wireless network 116.

At step 222, the serving AP 106B constructs a DPP authentication request using the public bootstrapping key from the authentication server 104. The DPP authentication request includes a hash of the public bootstrapping key received from the authentication server 104 and is provided to the IoT device 102. The IoT device 102 can decode the authentication request using a private bootstrapping key of the IoT device 102 and send a DPP authentication response to the AP 106B upon successfully decoding the authentication request. For example, the DPP authentication request may include encrypted data, such as a nonce and capabilities. The IoT device 102 decrypts the encrypted data to retrieve the nonce and capabilities, which are used to construct the DPP authentication response. The DPP authentication protocol is completed at step 222. On receiving a positive DPP authorization response from the IoT device 102 at the AP 106B, the AP 106B may complete DPP authentication of the IoT device 102. The IoT device 102 may generate a public network access key after successful verification of the public bootstrapping key of the IoT device 102.

At step 224, the DPP configuration protocol is initiated. Once the IoT device 102 is authenticated by the serving AP 106B, the IoT device 102 may send a DPP configuration request to the serving AP 106B. The DPP configuration request is sent to the serving AP 106B for receiving a security credential for the IoT device 102 for network access.

At step 226, using the public network access key of the IoT device 102, the serving AP 106B may generate a connector for the IoT device 102 while the DPP configuration request is pending (shown in step 226). In some examples, the connector for the IoT device 102 may include the public network access key of the IoT device 102. At step 228, the serving AP 106B may transmit a request to sign the connector to the configurator 108. At step 230, the configurator 108 may sign the connector using a configurator sign-in key of the configurator 108 and send the signed connector back to the AP 106B. At step 232, with the generation of the signed connector, the DPP configuration of the IoT device 102 with the security credential is complete and the signed connector may be provided to the IoT device 102, which may be used by the IoT device 102 to connect to the wireless network 116.

In other embodiments, the credential provided to the authenticated IoT device during the configuration state may be a password, with or without a username, or it may be a certificate.

At step 234, the serving AP 106B may transmit a DPP identity binding request to the authentication server 104 for binding a hash of the public network access key of the IoT device 102 with the hash of the public bootstrapping key of the IoT device 102. The hash of the public network access key of the IoT device 102 may be referred to as the connector identifier of the IoT device 102. The binding of a hash of the connector identifier and a hash of the public bootstrapping key of the IoT device 102 may allow the authentication server 104 to perform additional verification of the hash of data including the public bootstrapping key as required by DPP and the connector identifier during the network access stage 208.

During the network access stage 208, the IoT device 102 may gain access to the wireless network 116 via any of the APs 106 using the connector that the IoT device 102 has received from the serving AP 106B, without limiting the scope of the present disclosure. However, for simplicity of illustration, in the network access stage 208 illustrated in FIG. 2, the IoT device 102 is described as connecting to the wireless network 116 via the serving AP 106B.

At step 236, the IoT device 102 may discover any number of the APs 106 and transmit a peer discovery request and wait for a peer discovery response. In some examples, the IoT device 102 may send the peer discovery request to the AP 106B. The peer discovery request may include the connector of the IoT device 102 (e.g., the signed connector received from the serving AP 106B). The serving AP 106B may validate the connector of the IoT device 102 based on the configurator signature-key of the configurator 108. On successful validation of the connector, the AP 106B may generate and transmit a DPP network access authorization request including the connector identifier to the authentication server 104.

At step 238, based on the validity of the connector identifier of the IoT device 102, the authentication server 104 may authenticate and authorize the IoT device 102 for network access. The authentication server 104 may respond with a DPP network access authorization response in the form of permission or rejection. The authentication server 104 may validate the hash of the public network access key of the IoT device 102 and verify the hash of the public bootstrapping key of the IoT device 102 to decide on permitting or rejecting the IoT device 102 for the network access. Based on the DPP network access authorization response from the authentication server 104, at step 240, the serving AP 106B may communicate the peer discovery response that is a response to the peer discovery request received from the IoT device at step 236.

The serving AP 106B may generate the peer discovery response based on the DPP network access authorization response received from the authentication server 104. At steps 240, 242, and 244, if the IoT device 102 is permitted to access the wireless network 116 by the authentication server 104, the IoT device 102 may derive pairwise master key (PMK)/PMK identity (PMKID), perform IEEE-802.11 authentication, association, and a 4-way handshake with the serving AP 106B to obtain access to the wireless network 116.

As will be appreciated, in the examples presented herein, the authentication server 104 may provide a zero-touch-provisioning experience for provisioning the security credential to the IoT device 102 and connecting the IoT device 102 to the wireless network 116 using the security credential. When the IoT device 102 is brought into the system 100 and powered on, the sequence of operations described in the message flow diagram 200 may be performed. The entire process from powering on the IoT device 102 to connecting to the wireless network 116 may get completed within a short period without requiring any manual intervention. Additionally, in some examples, once the IoT device 102 is connected to the wireless network 116, its network behavior may be continuously monitored. The authentication server 104 may be notified by a monitoring device (not shown) if any security threat is detected. The monitoring of the IoT device 102 may include determining several parameters such as vulnerability and risk associated with the IoT device 102, owner of the IoT device 102, network behavior, and operating system status. Additionally, in some examples, the authentication server 104 may evaluate notifications from the monitoring device based on configurable policies (described later) and may change network access permissions for the connected IoT device 102 by issuing a change of authorization (CoA) to the serving AP 106B. This helps isolate any compromised IoT device quickly and prevents security threats from spreading through the system 100.

As described above, at step 214, the IoT device 102 broadcasts a DPP presence announcement message, including a hash of data including the public bootstrapping key of the IoT device 102. As a result of broadcasting, the DPP presence announcement can be received by any device and/or person listening on the channel frequency over which the DPP presence announcement is sent, including malicious entities. A malicious entity can obtain the DPP presence announcement, legitimately broadcasted by the IoT device 102, and use the obtained DPP presence announcement to execute a DoS attack on the network 116. For example, the malicious entity may operate an attacking device (e.g., another IoT device or any device capable of wireless communication on a network) to generate and send numerous duplicative iterations of the obtained DPP presence announcement from random MAC addresses, thereby bombarding the network 116 and clogging channel frequencies from access by other legitimate IoT devices. MAC addresses of devices sending of DPP messages to the serving AP 106B cannot be verified during the provisioning stage 206, thus the system 100 cannot distinguish between an attacking device and a legitimate IoT device, such as IoT device 102. MAC addresses are generally not included with bootstrapping authentication. In addition, MAC addresses are, themselves, spoofable and should not be relied upon as an identity at least, for example, during authentication of the DPP presence announcement message at steps 214 through 222. Thus, during the bootstrap authentication, even if a MAC address is provided, it may not be trustworthy.

Figure 3:
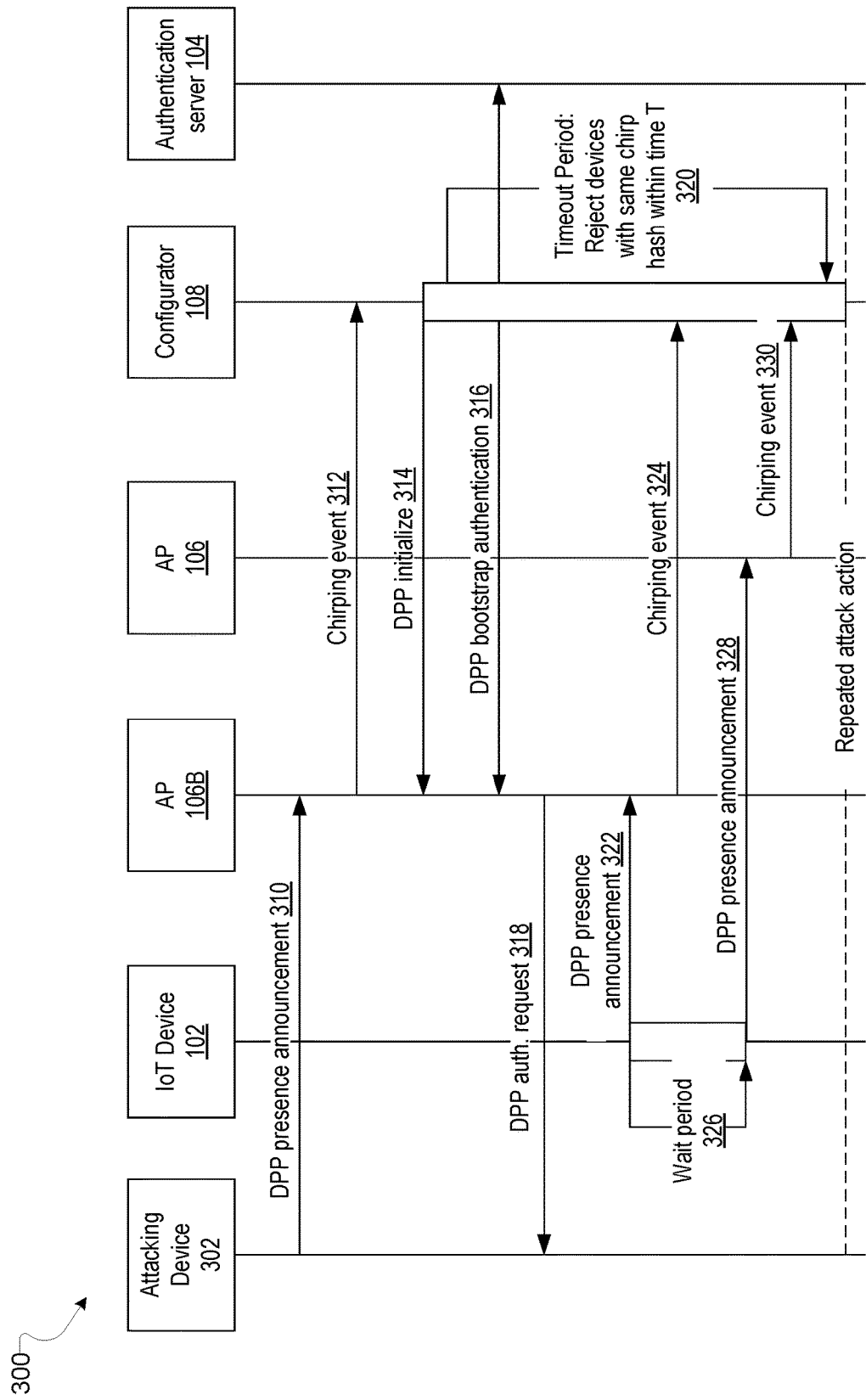
FIG. 3 illustrates a message flow diagram

FIG. 3 illustrates a message flow diagram 300 depicting a sequence of operations of a DoS attack on a wireless network disrupting the provisioning stage 206 of FIG. 2. For illustration purposes, the message flow diagram 300 will be described with reference to the system 100 of FIG. 1. The message flow diagram 300 includes interactions between various entities, such as an attacking device 302, the IoT device 102, the authentication server 104, the configurator 108, and APs, such as AP 106B and another of APs 106, in the system 100 in a provisioning stage 206 subject to DoS attacked.

As noted above, a malicious user may use attacking device 302 (or another device) to listen to DPP messages broadcasted over various frequencies of communication channels on network 116. Particularly, the malicious user may obtain one or more DPP presence announcement messages broadcasted by IoT device 102, for example, during step 214 of FIG. 2. The obtained DPP announcement message includes the hash of data including the public bootstrapping key of the IoT device 102. However, the malicious user and any device used to obtain the DPP announcement message would not have access to (at least through the DPP message exchange) the private bootstrapping key of the IoT device 102.

Subsequently, the malicious user can operate attacking device 302 execute the DoS attack as shown in FIG. 3. At step 310, the attacking device 302 scans all supported channels and broadcasts a DPP presence announcement message in the same way as the IoT device 102 at step 214 of FIG. 2. A DPP presence announcement message from the attacking device 302 is referred to herein as a spoofed DPP presence announcement message due its origin from invalid/attacking device 302. The spoofed DPP presence announcement message include a hash of data that includes a public bootstrapping key of the IoT device 102 (e.g., SHA256 ("chirp"|$B_R$) in the above example), and is broadcasted to APs 106, for example, AP 106B. In some cases, the attacking device 302 can broadcast spoofed DPP presence announcement messages periodically and on one or more channel frequencies, thereby bombarding the network 116 with numerous duplicative DPP messages from potentially many different MAC addresses, thereby obfuscating the real IoT device's MAC address.

At step 312, the configurator 108 may receive the DPP presence announcement message from the attacking device 302 that is, nonetheless, compliant with the DPP protocol via the APs 106 in the wireless network 116. The DPP presence announcement message from the attacking device 302 appears compliant due to spoofing the compliant and legitimate DPP announcement message from the IoT device 102. The DPP presence announcement message is received by the APs 106, which report a device chirping event to the configurator 108. The configurator 108 may monitor these device chirping events and, at step 314, the configurator 108 may select an AP (for example, the AP 106B) to initialize DPP communication.

At step 316, DPP bootstrap authentication protocol is initiated at the AP 106B to establish trust in the public bootstrapping key of the IoT device 102 included in the DPP presence announcement message, as described above in relation to FIG. 2. For example, DPP bootstrap authentication is initiated by sending a DPP bootstrap authorization request to the authentication server 104 to check if the public bootstrapping key of the IoT device 102, included in the hash of the data, is registered (see step 218 of FIG. 2). The serving AP 106B may generate the DPP bootstrap authorization request using the hash of the data including the public bootstrapping key of the IoT device 102 based on the hash that is present in the DPP presence announcements transmitted by the attacking device 302. The authentication server 104 may verify the public bootstrapping key is registered based on the hash of the data received in the DPP bootstrap authorization request. Based on successful verification of the public bootstrapping key, the authentication server 104 may authenticate the DPP presence announcement message and verify that attacking device 302 may be provisioned to access the wireless network 116 (see step 220 of FIG. 2). Upon successful verification of the public bootstrapping key of the IoT device 102, the authentication server 104 sends a positive DPP bootstrap authorization response with bootstrapping information (i.e., the public bootstrapping key) of the IoT device 102 and the ESSID of the wireless network 116 to the serving AP 106B.

At step 318, the serving AP 106B provides a hash of the public bootstrapping key received from the authentication server 104 to the attacking device 302 by sending a DPP authentication request to the attacking device 302. The attacking device does not have the private bootstrapping key of the IoT device 102. Thus, the attacking device 302 is not able to decode nor response to the DPP authentication request.

However, the configurator 108 only responds to identical chirping events after a set timeout period. During this timeout period, the configurator 108 rejects all chirping events that include an identical hash at step 320. In an example implementation, the time interval can be 30 seconds; however, the present disclosure should not be construed as limited to this specific interval as other intervals are applicable as desired for a particular application. Thus, as shown in FIG. 3, when IoT device 102 broadcasts subsequent DPP announcement messages with the hash including its the public key, these subsequent DPP announcement messages are rejected by the configurator 108. As a result, the legitimate IoT device 102 is prevented from obtaining a DPP authentication request through which the IoT device 102 can be onboarded.

For example, IoT device 102 periodically broadcasts DPP presence announcement message to the AP 106B and any other APs 106, respectively, on different frequency channels, at steps 322 and 328. The IoT device 102 waits a period of time, at step 326, between each DPP presence announcement message. Each AP 106B and AP 106 reports a device chirping event to the configurator 108, at steps 324 and 330, respectively. However, as a result of the spoofed DPP announcement message from the attacking device 302, the chirping events at steps 324 and 330 are rejected by the configurator 108 via chirping event reject messages, and the IoT device 102 is not able to be onboarded to the network 116.

Further, the attacking device 302 may check a time interval at which the AP (e.g., AP 106A and/or AP 106) processes and sends the DPP authentication request and increase the rate of spoofed DPP presence announcement messages to jam the network and exhaust the AP resources even further. Additionally, an attack could exhaust resources are the configurator 108, because when an AP 106 receives a DPP presence announcement message, it keeps forwarding chirp event messages to the configurator 108 requiring resources to parse and address. Thus, the legitimate IoT device 102 will not receive a DPP authentication request and would not be onboarded. Accordingly, The DoS attacks shown in FIG. 3 may result in downtime and data loss on network 116. Further, in a large network deployment, it can be difficult to narrow down and locate the malicious entities, thereby increasing downtime.

Figure 4:
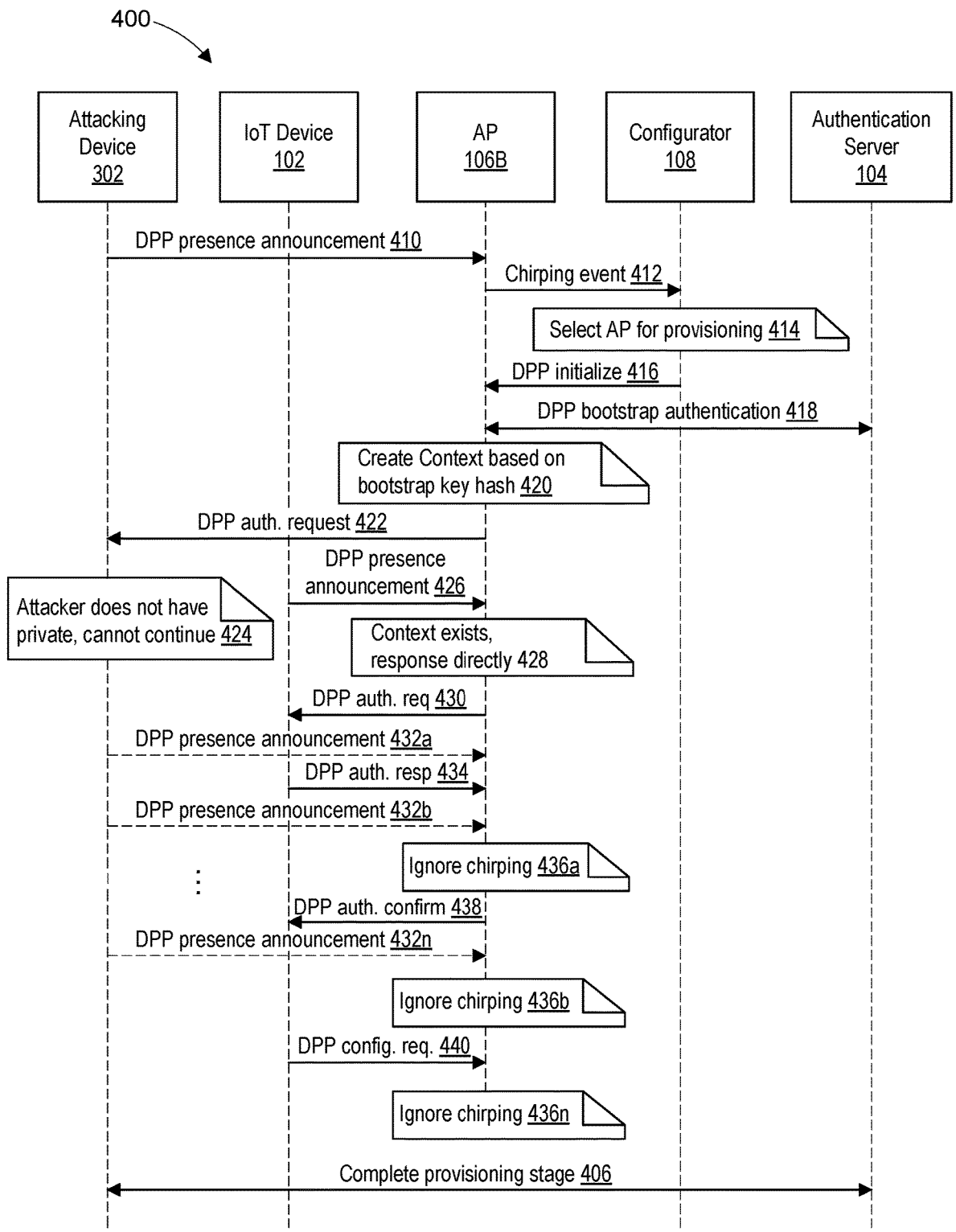
FIG. 4 illustrates a message flow diagram depicting a sequence of operations for mitigating DoS attacks while onboarding an IoT device to a wireless network in accordance with the implementations disclosed herein.

FIG. 4 illustrates a message flow diagram 400 depicting a sequence of operations for mitigating DoS attacks while onboarding an IoT device to a wireless network in accordance with the implementations disclosed herein. Thus, for example, the message flow diagram 400 provides a sequence of operations for enabling onboarding of the IoT device 102 to the wireless network 116 while mitigating DoS attacks described in relation to FIG. 3. The message flow diagram 400 includes interactions between various entities, such as the IoT device 102, the authentication server 104, the configurator 108, and the serving AP 106B, in the system 100 in a provisioning stage 406. Provisioning stage 406 is similar to provisioning stage 206, except as provided herein, and initial set-up stage 204 and network access stage 208 proceed as set forth above in connection with FIG. 2. For illustration purposes, the message flow diagram 400 will be described with reference to the system 100 of FIG. 1; however, the scope of the present disclosure should not be construed as limited to the specifics (e.g., the numbers and arrangements of the APs 106, the configurator 108, the IoT device 102, and the authentication server 104) of the system 100 of FIG. 1.

As described above in relation to FIG. 3, an attacking device 302 may obtain and spoof a DPP announcement message including a hash of a public bootstrapping key of an IoT device, such as IoT device 102. At step 410, the attacking device 302 scans all supported channels and broadcasts spoofed DPP presence announcement messages, as described above at step 310 of FIG. 3. The spoofed DPP presence announcement message includes a hash of the data including a public bootstrapping key of the IoT device 102.

At step 412, the configurator 108 may receive the spoofed DPP presence announcement message that is nonetheless compliant with the DPP protocol via the APs 106 in the wireless network 116. The DPP presence announcement message are received by the APs 106, which reports a device chirping event to the configurator 108 at step 412. The configurator 108 may monitor the device chirping event and, at step 414, may select an AP (for example, the AP 106B) to initialize DPP communication. At step 416, the configurator notifies the serving AP 106B to initialize DPP communication.

At step 418, DPP bootstrap authentication protocol is initiated at the AP 106B to establish trust in the public bootstrapping key of the IoT device 102 included in the DPP presence announcement message from the attacking device 302, for example, as described above in relation to FIG. 2. That is, DPP bootstrap authentication is initiated by sending a DPP bootstrap authorization request to the authentication server 104 to check if the public bootstrapping key of the IoT device 102 is registered (see step 218 of FIG. 2). The serving AP 106B may generate the DPP bootstrap authorization request using the hash of the data including the public bootstrapping key of the IoT device 102 present in the DPP presence announcement message transmitted at step 410. The authentication server 104 may verify the public bootstrapping is registered based on the hash of the data received in the DPP bootstrap authorization request. Based on successful verification of the public bootstrapping key, the authentication server 104 may authenticate the DPP presence announcement message and verify that attacking device 302 may be provisioned to access the wireless network 116 (see step 220 of FIG. 2). Upon successful verification of the public bootstrapping key of the IoT device 102, the authentication server 104 sends a positive DPP bootstrap authorization response with bootstrapping information (e.g., the public bootstrapping key) of the IoT device 102 and the ESSID of the wireless network 116 to the serving AP 106B.

At step 420, the serving AP 106B generates a context based on the bootstrapping information received from the authentication server 104, which is stored in a database (e.g., database 107B of FIG. 1). Particularly, responsive to receiving the bootstrapping authentication response from authentication server 104, the serving AP 106B creates a context using the public bootstrap key included in the bootstrap information. The context includes all necessary information for completing the provisioning stage 206 and onboard the IoT device corresponding to the bootstrapping information (e.g., IoT device 102). With the context, AP 106B does not need to communicate with configurator 108 and/or authentication server 104 to respond to subsequent DPP presence announcement messages. For example, the context includes a first flag indicating whether or not the AP 106B needs to respond to the chirp hash (e.g., SHA256("chirp"|$B_R$)) which is received from the configurator 108. If AP 106B is not selected to respond to the chirp harsh, the AP should ignore the chirp directly. Whereas, if the AP is selected to respond to the chirp hash, the AP does not need to communicate with configurator 108 any further. The context also can include a constructed DPP authentication request, so the AP 106B can respond to the chirp has directly with this DPP authentication request without re-construction via communication with the configurator 108 and/or authentication sever 104. The context can also include a MAC list of MAC that the AP 106B has received the same chirp hash from. In some case, a DoS attack can be inferred if the length of the MAC list exceeds a threshold. The context can also include a second flag indicating whether or not the AP receives a DPP authentication response from a legitimate IoT device (e.g., in response to a DPP authentication request). The second flag indicates a DPP authentication response was received, the AP ignores chirp hashes received from other IoT devices. Accordingly, for example, when AP 106B receives subsequent DPP presence announcement messages with same chirp hash, AP 106B can respond directly with the DPP authentication request without extra calculation and/or communication, thereby reducing resource consumption. The context can be referenced and utilized for onboarding the corresponding IoT device responsive to subsequently received DPP presence announcement messages.

In an example implementation, the context can be indexed by the chirp hash (e.g., SHA256("chirp"|$B_R$)) included in the DPP presence announcement message. The context can include syntax or code defining whether the AP 106B should respond to a received DPP presence announcement (e.g., the decision made by the configurator 108 in FIG. 2). The context may also include the public bootstrapping key, ESSID from authentication server 104. The context can also include a nonce, a DPP protocol key, and/or capabilities generated by AP 106B. The context can also include a DPP authentication request.

Then, at step 422, the serving AP 106B provides a DPP authentication request including a hash of the public bootstrapping key to the attacking device 302. At step 424, since the attacking device 302 does not have the private bootstrapping key of the IoT device 102, the attacking device 302 is not able to decode the DPP authentication request and does not (and cannot) respond.

Subsequently, at step 426, the IoT device 102 broadcasts one or more DPP presence announcements, for example, as described above in connection with FIG. 2. In one example, the DPP presence announcements may be carried by 802.11 action frames. At step 428, the serving AP 106B checks the database for whether or not a context for onboarding the IoT device 102 exists. If one does not exist (e.g., in a case where step 426 is a first DPP presence announcement received by the AP 106B), then the sequence performs steps 412-420 as set forth above to create a context. If a context does exist, the context is accessed to retrieve the bootstrapping information and generate a DPP authentication request. At step 430, the serving AP 106B communicates the DPP authentication request, including a hash of the public bootstrapping key contained in the context, to the IoT device 102. The IoT device 102 can decode the authentication request using its private bootstrapping key and send a DPP authentication response to the AP 106B upon successfully decoding the authentication request, at step 434. Upon receiving the positive DPP authorization response from the IoT device 102, the AP 106B may establish the DPP communication channel 118 between the selected AP 106B and the IoT device 102. The IoT device 102 may generate a public network access key after successful verification of the public bootstrapping key of the IoT device 102.

At step 438, the DPP configuration protocol is initiated at step 440, as set forth above with reference to step 224 of FIG. 2. Meanwhile, the attacking device 302 (or other attacking devices) may broadcast subsequent spoofed DPP presence announcement messages, each of which can include the hash of data including the public key of the IoT device 102 at steps 432a-432n. Similar to step 428, the serving AP 106B checks the database for whether or not a context for onboarding the IoT device 102 exists in response to each DPP presence announcement message. Due to the existence of the context for the IoT device 102, the serving AP 106B can refrain from reporting chirping events at steps 436a-436n. In some cases, the serving AP 106B may send DPP authentication requests using the context, as described above. While in other cases, due to the existence of the context for the IoT device 102 and that serving AP 106B is received a DPP authentication response from IoT device 102, the serving AP 106B can ignore the subsequent DPP presence announcement messages by refraining from sending any further DPP authentication requests.

Accordingly, message flow diagram 400 continues in the same manner as set forth above in connection with FIG. 2, all the while ignoring any future DPP presence announcement messages for which a context exists. For example, by storing a context including bootstrapping information received from the authentication server 104, the serving AP 106B of the implementations disclosed herein does not need to report a chirping event to the configurator 108, which may be rejected (e.g., a chirping event reject message to the AP) due to the earlier chirping event at step 412. As such, the serving AP 106B is able to complete the onboarding of IoT device 102, while ignoring attacking devices and DoS attacks can be mitigated.

Figure 5A:
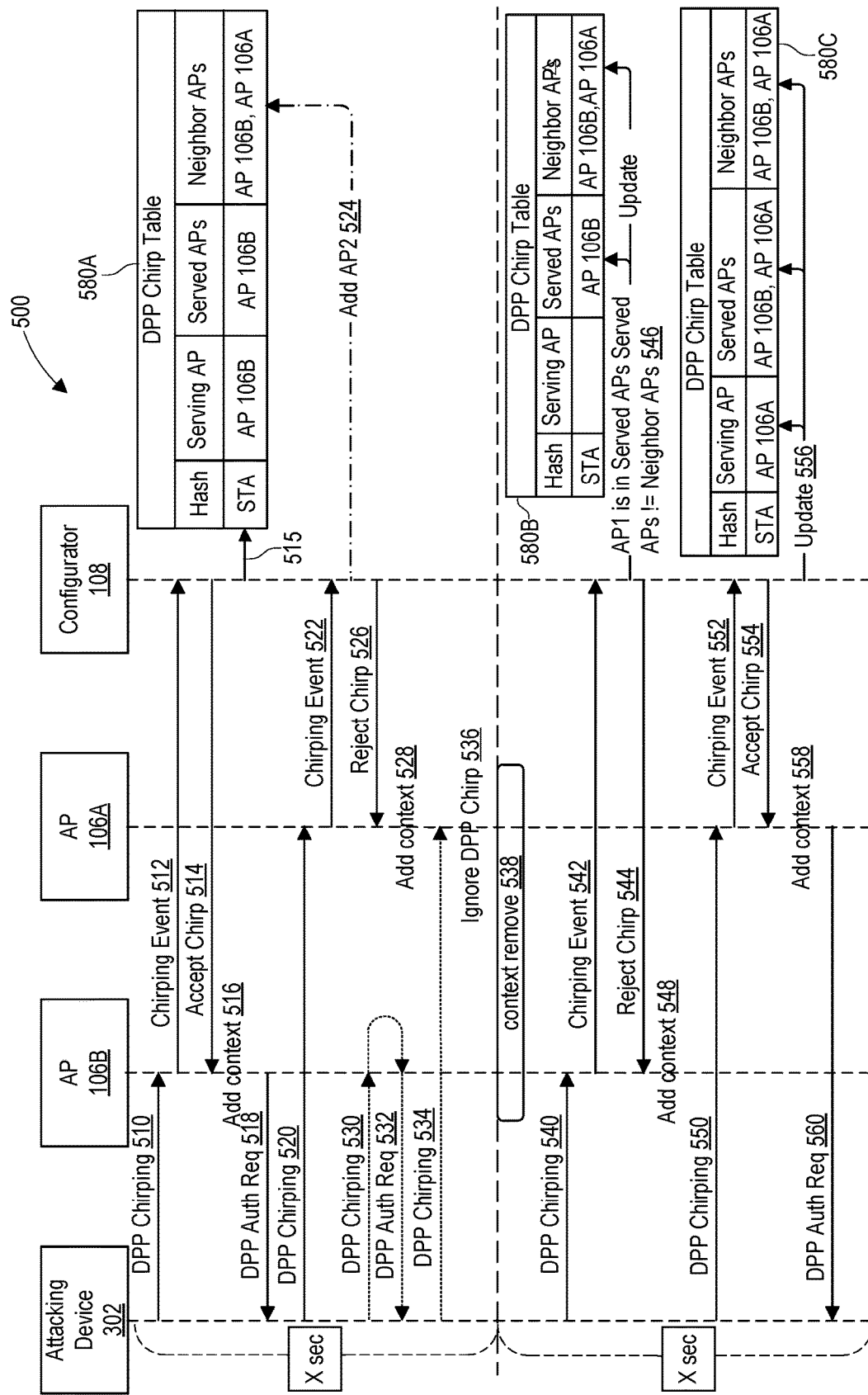
FIGS. 5A and 5B illustrate a message flow diagram depicting a sequence of operations for mitigating DoS attacks on multiple access points within a wireless network in accordance with the implementations disclosed herein.
Figure 5B:
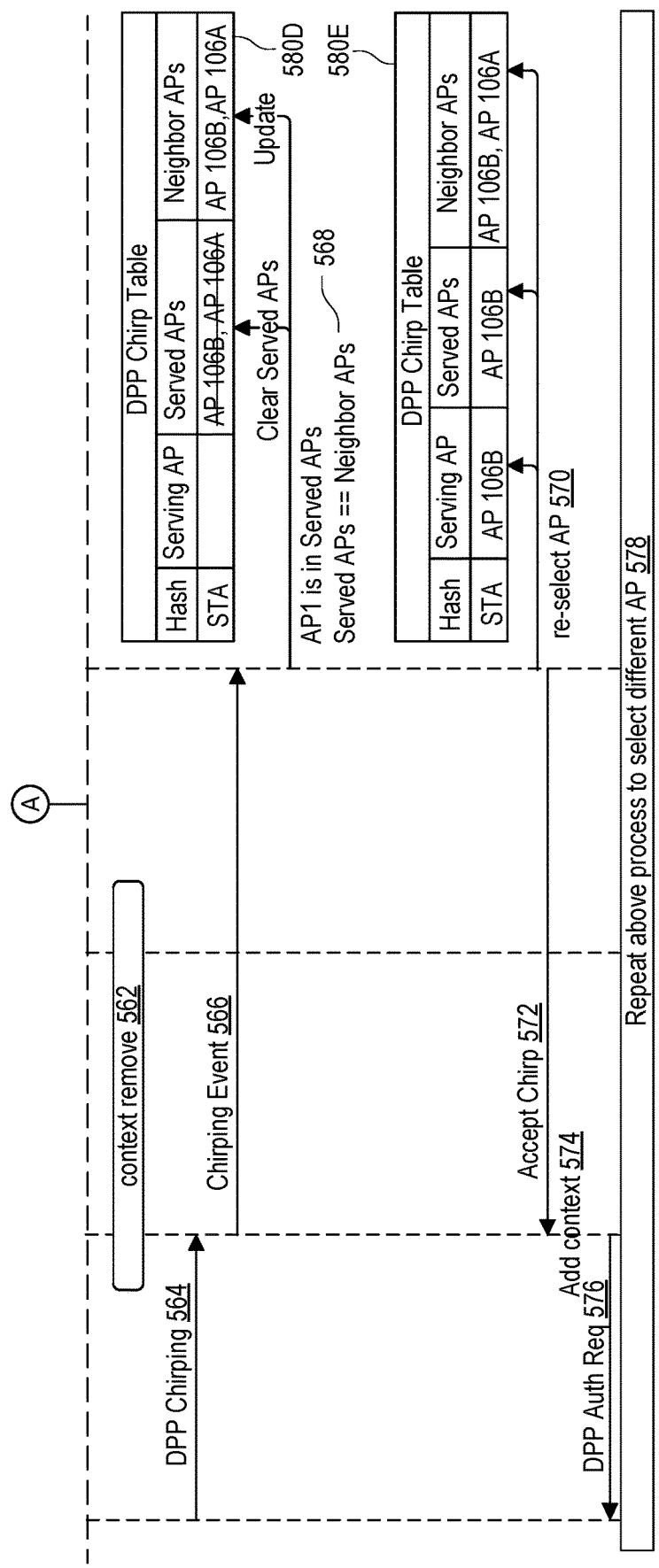

FIGS. 5A and 5B illustrate a message flow diagram 500 depicting a sequence of operations for mitigating DoS attacks across multiple APs in accordance with the implementations disclosed herein. The message flow diagram 500 provides a sequence of operations for enabling onboarding of IoT devices to the wireless network 116, while mitigating DoS attacks described in relation to FIG. 3 in a case where attacking device 302 is hopping between multiple channel frequencies on one or more APs 106. In the illustrative example of FIGS. 5A and 5B, attacking device 302 is shown hopping between AP 106B and 106A, however, the scope of the present disclosure should not be construed as limited to the specifics (e.g., the number of APs shown) and may include hopping between numerous APs 106. Furthermore, the message flow diagram 500 includes interactions between various entities, such as the attacking device 302 of FIG. 3 and the configurator 108, AP 106B and AP 106A, in the system 100 during a provisioning stage. For illustration purposes, the message flow diagram 500 will be described with reference to the system 100 of FIG. 1; however, the scope of the present disclosure should not be construed as limited to the specifics (e.g., the numbers and arrangements of the APs 106 and the configurator 108) of the system 100 of FIG. 1.

As shown in FIGS. 5A and 5B, the configurator 108 can maintain a DPP chirp table 580 (also referred to as a chirp table) for mapping IoT devices, recorded according to IoT device identifiers (e.g., respective hashes of their respective bootstrapping keys), against a current servicing (e.g., serving AP), APs that have served/provisioned the respective IoT devices in the past, and a listing of neighboring APs. For example, as shown in FIGS. 5A and 5B, example DPP chirp table 580 includes entries for mapping APs to an identifier of a IoT device (e.g., STA in this example). The table 580 includes a serving AP column including fields for indicating a currently selected AP for serving the identifier STA, a served AP column including fields for listing APs that previously served the identifier STA, and fields in a neighboring AP column listing APs that have reported chirping events, to the configurator 108, which included the identifier STA. Thus, table 580 associates each respective IoT device identifier with a serving AP, served APs, and neighboring APs. The DPP chirp table 580 is updated as DPP chirp table 580A-580D during the operations shown in message flow diagram 500, and will be collectively referred to as DPP chirp table 580. The table 580 shown in FIGS. 5A and 5B depicts a single IoT device identifier for illustrative purposes only. The table 580 may include separate entries for each IoT device identifier for which chirping events have been reported to the configurator 108.

In message flow diagram 500, AP 106A and AP 106B are on different frequencies, for this illustrative example, and the attacking device 302 sends DPP chirp signals (e.g., DPP presence announcement messages) on different frequencies before receiving a DPP authentication request, for example, as described above in relation to FIG. 3. In the illustrative example, a timeout period of X seconds (where X is an integer selected as desired for a given application) is provided for the provisioning stage such, that if all the DPP chirp signals received by a serving AP are from an illegitimate/invalid device (e.g., the serving AP does not receive a DPP authentication response within the timeout period), the configurator 108 will select another AP to provision the IoT device identified by the DPP chirp signal.

At steps 510, 520 and 530, the attacking device 302 broadcasts a DPP chirp signal as described above in relation to FIG. 3. For example, at step 510 and 530, one or more spoofed DPP chirp signals are broadcasted on a first channel frequency, which are received by the AP 106B. Over the same period of time, at step 520, the attacking device 302 broadcasts one or more spoofed DPP chirp signals on a second channel frequency, which are received by the AP 106A. The spoofed DPP presence announcement messages include an identifier of an IoT device (e.g., a hash of the data including a public bootstrapping key of the IoT device, illustrated as "STA" or station).

At step 512, the configurator 108 may receive a list of DPP chirp signals from the attacking device 302 via the AP 106B. The AP 106B may listen to the DPP chirp signals from the attacking device 302 and report a device chirping event to the configurator 108. The configurator 108 may monitor these chirping events, and, at step 514, select an AP (for example, the AP 106B) to initialize DPP communication based on the identifier of the IoT device included in the DPP chirp signal. Additionally, at step 515, the DPP chirp table 580 is updated to include the identifier of the IoT (e.g., STA) and the AP 106B is selected as the serving AP. Furthermore, the served APs field and neighbor APs field for the identifier of the IoT device are updated to include AP 106B.

DPP bootstrap authentication protocol is initiated at the AP 106B to establish trust in the identifier of the IoT device included in the DPP chirp signal, as described above in relation to FIGS. 2-3. Based on successful verification of the identifier, the authentication server (not shown in FIGS. 5A and 5B) may authenticate the DPP chirp signal and verify that attacking device 302 may be provisioned to access the wireless network 116. Upon successful verification of the identifier, the authentication server sends a positive DPP bootstrap authorization response with bootstrapping information to the serving AP 106B.

At step 516, the serving AP 106B generates a context based on the bootstrapping information received from the authentication server, for example, as described in relation to step 420 of FIG. 4. Particularly, responsive to receiving the bootstrapping authentication response, the serving AP 106B creates a context using the public bootstrap key of included in the bootstrap information.

At step 518, the serving AP 106B provides the hash of the public bootstrapping key to the attacking device 302 by sending a DPP authentication request. The attacking device does not have the private bootstrapping key of the IoT device. Thus, the attacking device 302 is not able to decode the hash of the public bootstrapping key and cannot respond to the DPP authentication request.

As mentioned above, at step 520, the attacking device 302 broadcasts spoofed DPP chirp signals on the second channel frequency, which are received by the AP 106A. At step 522, the configurator 108 receives a list of DPP chirp signals from the attacking device 302 via the AP 106A. The configurator 108 monitors these chirping events, and, at step 526, the configurator 108 rejects the chirping event via a chirping event reject message since it includes the identifier of the IoT device, which has already been provisioned to AP 106B. At step 524, configurator 108 adds the AP 106A to the DPP chirp table as a neighbor AP, based on the received chirp event having the identical hash.

At step 528, the AP 106A generates a context based on bootstrapping information received, for example, as described in relation to step 420 of FIG. 4. For example, AP 106A uses the chirping event reject message to construct a context that drops (or ignores) future DPP chirp signals containing the same chirp hash.

At step 530, the AP 106B receives one or more subsequent DPP chirp signals from the attacking device 302 broadcasted on the first channel frequency. Due to the existence of the context at the AP 106B, the serving AP 106B provides the hash of the public bootstrapping key to the attacking device 302 by sending a DPP authentication request at step 532. Again the attacking device 302 cannot respond to the DPP authentication request.

At step 534, the AP 106A receives one or more subsequent DPP chirp signals from the attacking device 302 broadcasted on the second channel frequency. Due to the existence of the context at the AP 106A and that AP 106A was not provisioned for serving the IoT device, the AP 106A ignores the DPP chirp signal, at step 536, and refrains from sending an DPP authentication request or reporting a chirping event.

After the timeout period elapses, the APs 106A and 106B remove the context from their respective databases (e.g., by deleting the context) at step 538. The message flow diagram 500 can then repeat responsive to further subsequent DPP chirp signals from attacking device 302 during a second time period. Furthermore, the configurator 108 deselects AP 106B as the serving AP from the DPP chirp table 580 (e.g., DPP chirp table 580B), while maintaining the listing of served APs and neighbor APs from DPP chirp table 580A. As the serving AP is cleared, the entries for the served APs and the neighbor APs are compared and, if both have the same entries, the served AP is cleared. Otherwise, the served AP entry is maintained, as shown in DPP chirp table 580B.

Any new chirp events from AP 106B will be rejected via chirping event reject message during the second time period since AP 106B timed out during the first iteration of message flow diagram 500. For example, at step 540 a DPP chirp signal is received by AP 106B and reported as chirping event to the configurator 108 at step 542. The configurator 108 checks the DPP chirp table 580 at step 546, and verifies that AP 106B was already provisioned for serving the IoT device identified by the chirping event and that listing of APs in the served AP field for the identifier does not match (e.g., !=operator) the listing of APs in the neighbor AP field. As a result, at step 544, the configurator 108 rejects the chirp event via chirping event reject message. At step 548, the AP 106B generates a context based on bootstrapping information received, for example, as set forth above.

New DPP chirp signals from another AP will be accepted and the DPP chirp table 580 for the IoT device identifier can be updated. For example, at step 550 the AP 106A receives a DPP chirp signal from attacking device 302 and reports the chirp signal as a chirping event at step 552. The configurator 108 checks the DPP chirp table 580 and confirms that AP 106A is not listed in the served AP field for the identifier STA. The configurator 108 accepts the chirping event, and, at step 554, selects AP 106A to initialize DPP communication based on the hash of the data including the public bootstrapping key included in the DPP chirp signal. At step 556, the DPP chirp table 580 is updated to include the AP 106A as the serving AP and listed in the served AP field (see DPP chirp table 580C). At step 558, the AP 106A generates a context based on bootstrapping information received, for example, as set forth above, and sends a DPP authentication request to the attacking device 302 at step 560. As with the preceding instances, the attacking device 302 is not able to decode nor respond to the DPP authentication request.

After the second timeout period elapses, the APs 106A and 106B remove the context from their respective databases at step 562. Any new DPP chirp signal including the identifier STA would be accepted following step 562, because the list of APs in the served AP field matches the list of APs in the neighbor AP, which clears the served AP field so to restart the sequence (see DPP chirp table 580D). Thus, for example, at step 564, a DPP chirping signal is received at AP 106B, which reports chirping event 566 to the configurator 108. At this point, all the APs listed in the neighbor AP entry matches the APs that have been provisioned to serve the identified IoT device. Thus, the served AP field is cleared, while the neighbor AP list is maintained, at step 568. Then at step 570, the configurator re-selects AP 106B as the serving AP and accepts the chirping at step 572 to initialize DPP communication based on the identifier of the IoT device included in the DPP chirp signal. At step 574, the AP 106B generates a context based on bootstrapping information received, for example, as set forth above, and sends a DPP authentication request to the attacking device 302 at step 576. As with the preceding instances, the attacking device 302 is not able to decode the hash of the public bootstrapping key and cannot respond to the DPP authentication request. The sequence may be repeated at step 578 to select different APs as needed.

Accordingly, in the example multiple AP case shown in FIGS. 5A and 5B, the disclosed implementations can make sure legitimate IoT device can be provisioned eventually. For example, if a DPP chirp signal from a legitimate IoT device is heard by AP 106B during the first timeout period, the AP 106B can be provisioned within the first X seconds. Further, if a DPP chirp signal from the legitimate IoT device is heard by AP 106A during the second timeout period, the AP 106A can be provisioned in second X seconds.

Figure 6:
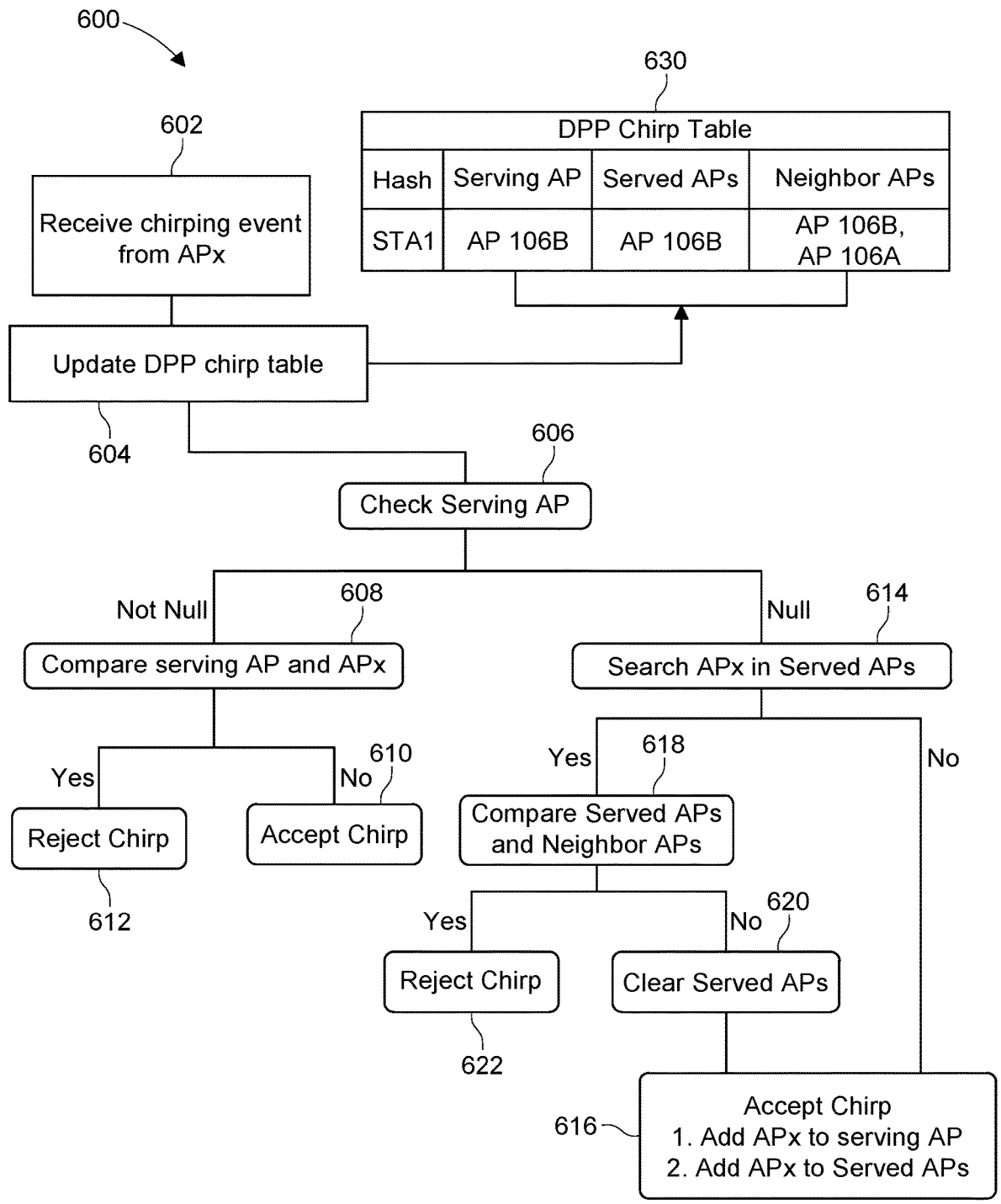
FIG. 6 is a flow chart depicting a method of operations performed by a configurator for maintaining a DPP chirp table in accordance with the implementations disclosed herein

FIG. 6 is a flow chart depicting a method 600 of operations performed by a configurator maintaining the DPP chirp table in accordance with the implementations disclosed herein. The method 600 provides a sequence of operations for monitoring and mapping serving and served APs in a wireless network, while devices hop between multiple channel frequencies on multiple APs. Particularly, method 600 illustrates operations to determine whether to accept or reject chirping events received from a device via an AP and updating a DPP chirp table 630. The method 600 includes operations performed by a configurator, such as the configurator 108 based on interactions with APs 106 of system 100 during a provisioning stage. For illustration purposes, the method 600 will be described with reference to the system 100 of FIG. 1; however, the scope of the present disclosure should not be construed as limited to the specifics (e.g., the numbers and arrangements of the APs 106 and the configurator 108) of the system 100 of FIG. 1.

At block 602, the configurator 108 receives a chirping event from an AP 106 (e.g., AP 106A in this example). For example, the chirping event may be reported by one of APs 106 responsive to receiving a DPP chirp signal as set forth above. At block 604, a DPP chirp table is accessed and updated, for example, by removing any stale APs (e.g., an AP does not report chirp events for determined length of time, the AP should be deleted from neighbor AP list and served AP list as a "stale AP") from the table and adding AP 106A to the neighbor AP field associated with the identifier of the IoT device included in the chirping event. For example, as shown in FIG. 6, example DPP chirp table 630 includes entries for mapping APs to an IoT device identified, such as a hash of its public bootstrapping key (e.g., STA1 in this example). The table 630 includes a serving AP column having a field indicating an AP that is currently serving the identifier of the IoT device (e.g., AP 106B in this example), a served AP column having fields indicating any APs that have previously served the identified IoT device, and a neighboring AP column having a field listing all known APs that have reported chirping events, which included the identifier of the IoT device. Thus, table 630 associates the IoT device identifier with a serving AP, served APs, and neighboring APs. In the illustrative example, AP 106A is added to neighbor APs at block 604 in the event that block 602 was the first instance of AP 106A reporting a chirping event that included STA1.

At block 606, the configurator 108 checks the serving AP field in the DPP chirp table 630 for the IoT device identifier included in the chirp event received at block 602. If the serving AP field is populated (e.g., Not Null) with an entry, the method proceeds to block 608, where the configurator compares an AP listed in the serving AP field against the AP that sent the chirping event at block 602. If the serving AP is equal to (e.g., matches) the AP that sent the chirping event (e.g., AP 106A in this example), the configurator accepts the chirping event, at block 610, and instructs the AP 106A to initialize DPP communication based on the identifier of the IoT device included in the DPP chirp signal (e.g., as described with reference to steps 514, 554, and 572 of FIGS. 5A and 5B). Otherwise, at block 612, the configurator 108 rejects the chirping event (e.g., as described with reference to steps 526 and 544 of FIGS. 5A and 5B).

Returning to block 606, if the serving AP entry is not populated (e.g., Null) with an entry, the method proceeds to block 614, where the configurator 108 searches for the AP that sent the chirping event at block 602 (e.g., AP 106A) in the served APs field of the identifier of the IoT device. If AP 106A is not listed as a served AP in the DPP chirp table 630, the configurator 108 accepts the chirping event at block 616 and instructs the AP 106A to initialize DPP communication based on the hash of the data including the public bootstrapping key included in the DPP chirp signal (e.g., as described with reference to steps 514, 554, and 572 of FIGS. 5A and 5B). Furthermore, at block 616, the DPP chirp table 630 is updated to include AP 106A in the serving AP field and the served AP field associated with the identified of the IoT device included in the chirping event received at block 602.

If, at block 614, the configurator 108 locates AP 106A in the served AP field for the IoT device identifier, the configurator 108 compares the APs listed in the served AP field to the APs listed in the neighbor APs field, at block 618. If the entries are the same, at block 620, the configurator 108 updates the DPP chirp table 630 by clearing the served AP field and proceeds to block 616. Otherwise, the configurator 108 rejects the chirping event at block 622, same as block 612.

Figure 7:
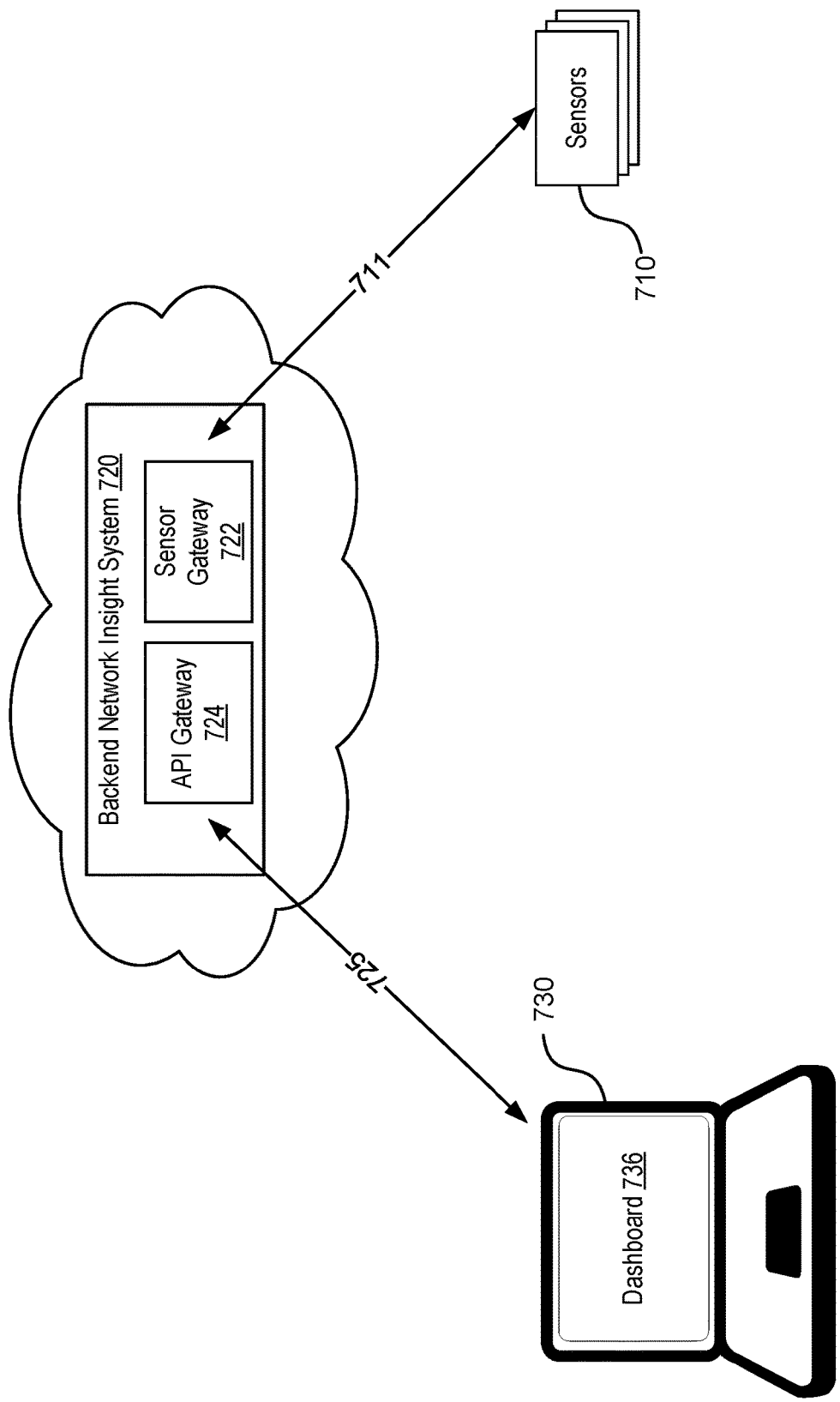
FIG. 7 illustrates an example backend network insight dashboard system communicating monitoring/test information or data to a frontend network insight system in accordance with the implementations disclosed herein.

FIG. 7 illustrates an example of sensors 710 communicating monitoring/test information or data to frontend network insight dashboard system 730 on or in which a dashboard 736 may be implemented or presented, e.g., to a user, via backend network insight system 720. For example, the owner or administrator of a network (e.g., network 116 of FIG. 1) may have an interest in determining the current status/state of a network, applications running thereon, etc. Sensors 710 may connect to or otherwise communicatively coupled (e.g., via wired or wireless connection) to backend network insight system 720 via device gateway 722. Sensors 710 may be implemented, for example, as a configurator (e.g., configurator 108 as described herein) and/or access points (e.g., access points 106 as described herein). Sensors 710 may transmit monitoring information/data 711 to backend network insight system 720 responsive to detecting certain conditions in the network. The API gateway 724 of backend network insight system 720 may then forward or transmit the monitoring information/data 725 to dashboard system 730. The monitoring or testing information/data may be presented to a user via dashboard 736 of dashboard system 730 (which may be a computer, workstation, laptop, or other computing/processing system or component capable of receiving and presenting such information/data).

In an example case where sensor 710 is implemented as configurator 108, the DPP chirp table may be utilized to detect the occurrence of condition indicative of an attack on the network 116. For example, the sensor 710 can leverage the DPP chirp table, as described above, to detect conditions that suggest a DoS attack is underway by a identifying a number of APs that have been unable to successfully onboard a device (e.g., have not received a DPP authentication response responsive to a DPP authentication request). That is, the sensor 710 can use the DPP chirp table, maintained in a database coupled thereto, to track a number of APs that has been provisioned to serve an IoT device identifier, but did not receive a DPP authentication response within the timeout period. For example, referring to the sequence of FIGS. 5A and 5B as an example, APs 106A and 106B do not receive DPP authentication responses throughout the sequence withing the timeout periods, and as a result the APs 106A and 106B are listed in the served APs and neighboring APs (e.g., according to the method of FIG. 6). If the number of APs listed in the served AP field, for a given IoT identifier entry, exceeds a set threshold number of APs (e.g., as configured by a use via frontend network insight dashboard system 730), the configurator 108 determines that the conditions indicative of a DoS attack are present and transmits a notification of the detected conditions to the frontend network insight dashboard system 730, which notifies the user of a potential DoS attack. Otherwise, if the number of APs is below the threshold, this could be indicative of other issues such as poor signal strength. The threshold number of APs may be set to any positive integer as desired to identify an attack. The user can then perform remedial operations to locate and address the potential attack.

In another example, sensors 710 can be implemented as APs 106 and the sensors 710 can be configured to track a number of DPP presence announcement message received withing a set unit of time. If the number of DPP presence announcement message received by the sensor 710 exceeds a threshold number of DPP presence announcement messages, the sensor 710 determines conditions are present indicative that a potential DoS attack is underway and generates a notification to report the detected DoS attack to a user. As another example, the sensor 710 may determine conditions are present indicative of a potential DoS attack when the sensor 710 receives the same DPP presence announcement message (e.g., contains the same chirp hash) from a threshold number of different MAC addresses. For example, the sensor 710 transmits the notification to directly or indirectly (e.g., via configurator 108) to the backend network insight system 720. The backend network insight system 720 then forwards or transmits the notification to the dashboard system 730 as information/data 725. The unit of time and the threshold number of DPP presence announcement messages may be set by the user via the dashboard system 730. By receiving the notification form one or more specific sensors 710 implemented as APs 106, the location of a malicious entity (e.g., the source of the DoS attack) may be narrowed down to locations of the one or more APs that detected conditions indicative of the attack.

In some examples, the sensors 710 may be implemented as configurator 108 and APs 106 in conjunction. In such configurations, the sensors 710 can detect a plurality of conditions to better assist the user to predict and address detected DoS attacks on the network. For example, the configurator 108 can detect an attacker that is frequency hopping across multiple APs via the DPP chirp table, which may not satisfy conditions for detecting the attack at the APs individually. Conversely, each AP 106 can detect an attacker locally (e.g., on the AP itself). Thus, the sensors 710 can operate together to provide network-wide detection of potential DoS attacks, which a user can identify and implement remedial actions to avoid downtown and data loss in the network.

Figure 8:
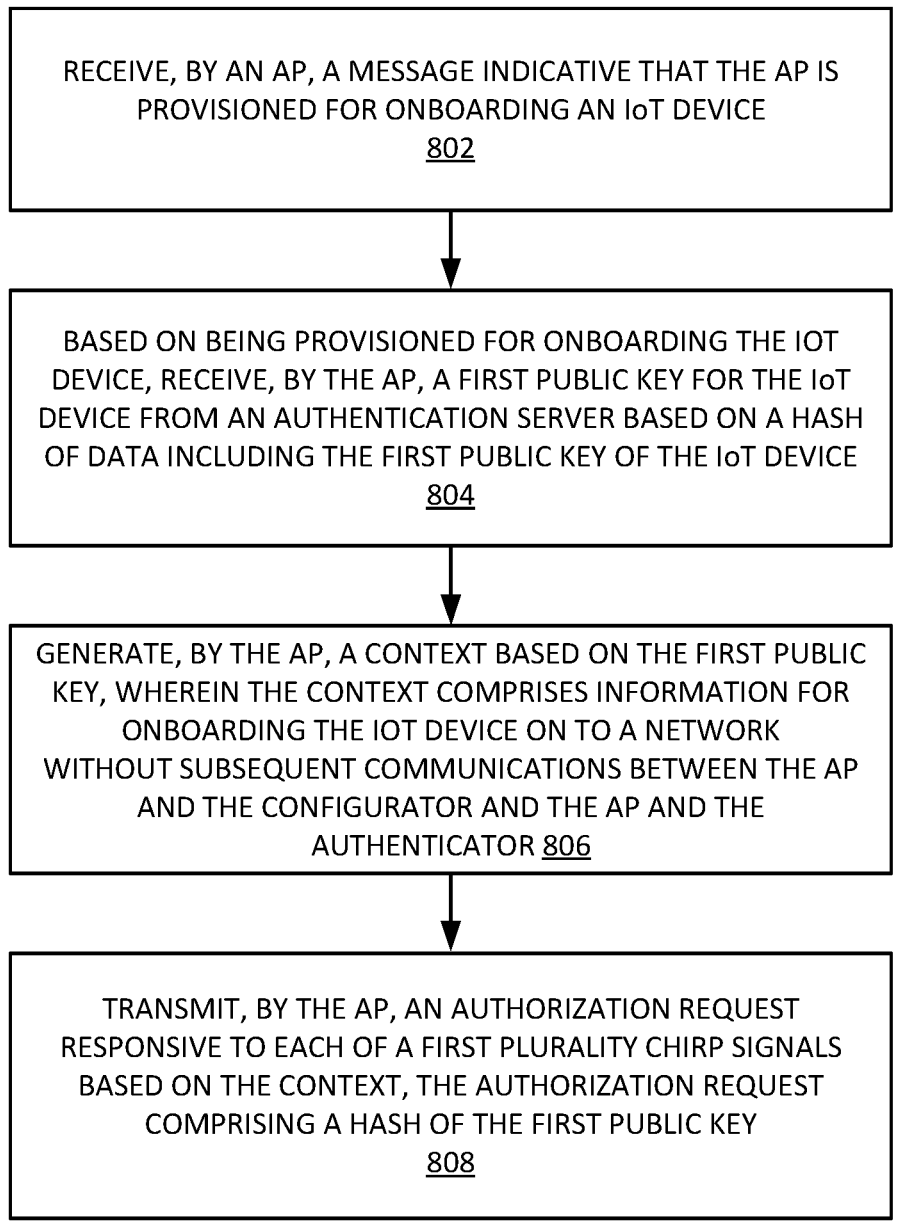
FIG. 8 is an example flow chart illustrating example operations for mitigating a DoS attack on a network in accordance with the implementations disclosed herein.

FIG. 8 is a flow chart illustrating example operations for mitigating a DoS attack on a network in accordance with the implementations disclosed herein. FIG. 8 illustrates a process 800 that may be implemented as instructions, for example, stored in a memory of an access point 106 of FIG. 1, that, when executed by one or more processors, perform the operations of process 800.

At block 802, an AP receives, from a configurator, a message indicative that the AP is provisioned for onboarding an IoT device. The message may include a hash of data including a first public key (for example, a hash of data including a public bootstrapping key, such as SHA256 ("chirp"$|B_R$)) of the IoT device. The message can be received based on a chirping event received by the configurator from the AP or another AP responsive to the AP or the other AP receiving a chirp signal comprising the hash of data including the first public key of the IoT device. For example, the chirp signal may be a DPP presence announcement message and the message received from the configurator may be a DPP initialization message accepting the chirping event, as described above in relation to FIGS. 2 and 4-6. The AP may be, for example, AP 106B and configurator may be configurator 108 of FIG. 1. The chirp signal can be received by the AP from the IoT device or another device, such as an attacking device.

At block 804, based on being provisioned for onboarding the IoT device, the AP receives verification of the first public key for the IoT device from an authentication server based on the hash of the data including first public key of the IoT device. For example, the authentication server may be authentication server 104 of FIG. 1, which can perform DPP bootstrapping authentication, such as described in relation to FIGS. 2-4.

At block 806, the AP generates a context based on the first public key. The context includes information necessary of for onboarding the IoT device on to a network (e.g., network 116). For example, the context can be used for onboarding the IoT device without subsequent communications with the configurator and the authenticator. The context is generated as described above in relation to FIGS. 4 and 5.

Then, at block 808, the AP transmits an authorization request responsive to each of a first plurality chirp signals based on the context. For example, the AP generates the authorization request without reporting the chirping event to the configurator, and determines at the AP to send the authorization request (e.g., a DPP authorization request), for example, as described in relation to FIGS. 3 and 4 above. The authorization request comprises the hash of the first public key, which an attacking device cannot decode due to lacking the corresponding first private key. Thus, the attacking device does not send an authentication response. However, the AP can use the context to send subsequent authentication requests responsive to receiving subsequent chirp signals, and, in the case of a valid IoT device having the first private key, receives an authentication response and establish a communication channel with the IoT device (e.g., DPP communication channel 118).

Figure 9:
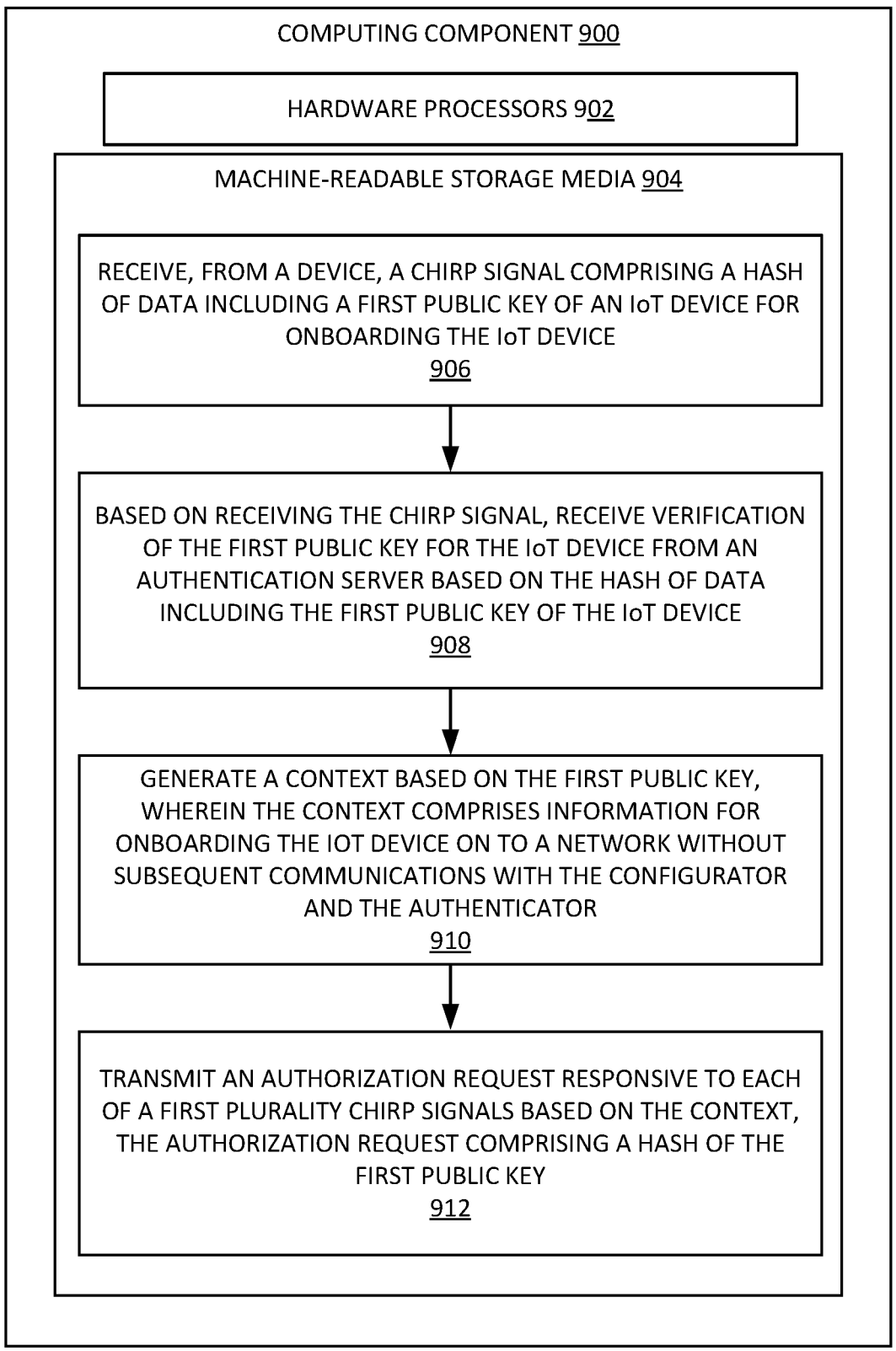
FIG. 9 is an example computing component that may be used to implement various features of DoS attack mitigation in accordance with the implementations disclosed herein.

FIG. 9 is an example computing component that may be used to implement various features of DoS attack mitigation in accordance with the implementations disclosed herein. Referring now to FIG. 9, computing component 900 may be, for example, a server computer, a controller, or any other similar computing component capable of processing data. Particularly, FIG. 9 may be implemented in an access point 106 of FIG. 1. In the example implementation of FIG. 9, the computing component 900 includes a hardware processor 902 and machine-readable storage medium 904.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 906-912, to control processes or operations for burst preloading for available bandwidth estimation. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some implementations, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-912.

Hardware processor 902 may execute instruction 906 to receive, from a device, a chirp signal comprising a hash of data including a first public key (e.g., a hash of data including a public bootstrapping key, such as SHA256 ("chirp"|$B_R$)) of an IoT device for onboarding the IoT device corresponding to the hash. For example, the chirp signal may be a DPP presence announcement message received from the IoT device or another device, such as an attacking device.

Hardware processor 902 may execute instruction 908 to, based on receiving the chirp signal, receive verification of the first public key for the IoT device from an authentication server based on the hash in the chirp signal. For example, responsive to receiving the chirp signal, the hardware processor 902 may execute instructions to transmit a chirping event to a configurator. The configurator may accept the chirping event and provision the hardware processor 902 for serving the IoT device corresponding to the first public key or reject the chirping event. In either case, the hardware processor 902 may execute instructions to send a key authorization request to the authentication server (e.g., a bootstrapping key authentication request as described above in connection with FIGS. 2 and 4), in response to receiving the response to the chirping event received from the configurator.

Hardware processor 902 may execute instruction 910 to generate a context based on the first public key. The context includes information necessary of for onboarding the IoT device on to a network (e.g., network 116). For example, the context can be used for onboarding the IoT device without subsequent communications with the configurator and the authenticator. The context is generated as described above in relation to FIGS. 4 and 5.

Hardware processor 902 may execute instruction 912 to transmit an authorization request responsive to each of a first plurality chirp signals based on the context. The authorization request includes the hash of the first public key. For example, the hardware processor 902 may execute instructions to generate the authorization request without reporting the chirping event to the configurator, and determine to send the authorization request (e.g., a DPP authorization request), for example, as described in relation to FIGS. 3 and 4 above. Since an attacking device cannot decode the hash included in the authorization request, the attacking device does not send an authentication response. However, the hardware processor 902 may execute instructions to use the context to send subsequent authentication requests responsive to receiving subsequent chirp signals, and, in the case of a valid IoT device having the first private key, receives an authentication response and establish a communication channel with the IoT device (e.g., DPP communication channel 118).

Figure 10:
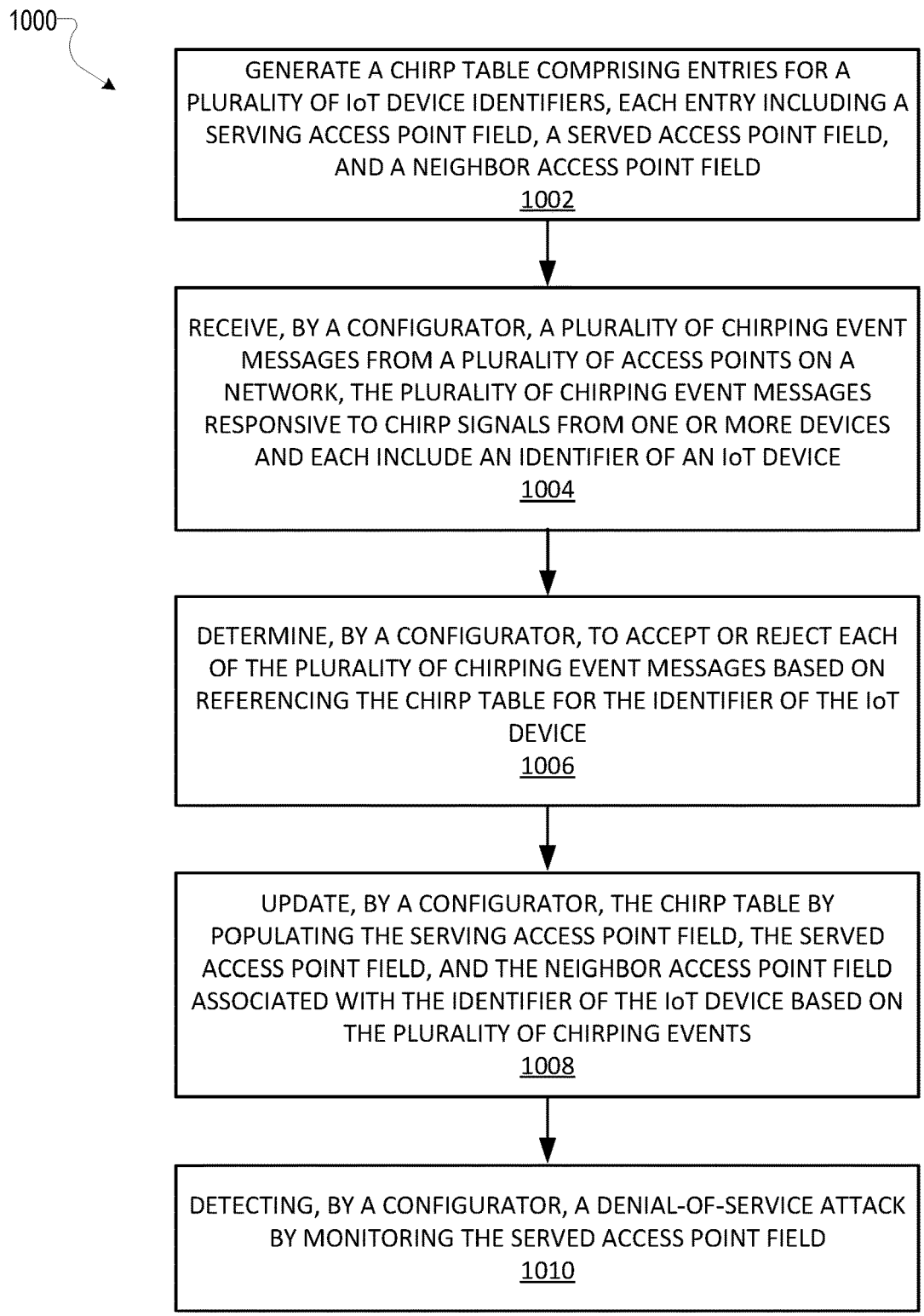
FIG. 10 is an example flow chart illustrating example operations for detecting DoS attacks on a network in accordance with the implementations disclosed herein.

FIG. 10 is a flow chart illustrating example operations for detecting DoS attacks on a network in accordance with various implementations disclosed herein. FIG. 10 illustrates a process 108 that may be implemented as instructions, for example, stored on a memory of configurator 108 for FIG. 1, that when executed by one or more processors performs the operations of process 1000.

At block 1002, a chirp table is generated comprising entries for a plurality of IoT device identifiers. For example, a DPP chirp table as described above in connection with FIGS. 5 and 6. Each entry of the chirp table includes a serving access point field, a served access point field, and a neighbor access point field associated with a respective IoT device identifier.

At block 1004, the configurator 108 receives a plurality of chirping event messages from a plurality of APs 106 on network 116, the plurality of chirping event messages are responsive to chirp signals from one or more devices (e.g., IoT devices and/or other devices). Each chirp signal includes an identifier of an IoT device, for example, a hash of a first public key (e.g., public bootstrapping key) of the IoT device. In some cases, the chirp signals may be spoofed and communicated by an attacking device 302.

At block 1006, the configurator 108 determines to accept or reject each of the plurality of chirping event messages based on referencing the chirp table for the identifier of the IoT device. For example, the configurator locates the identifier of the IoT device in the chirp table and determines whether to accept or reject each chirping event sent by a respective AP based on the chirp table, for example, as set forth above in relation to FIGS. 5 and 6.

At block 1008, the configurator updates the chirp table by populating the serving access point field, the served access point field, and the neighbor access point field associated with the identifier of the IoT device based on the plurality of chirping events. For example, fields associated with the identifier of the IoT device in the chirp events are updated with access points as described above in connection with FIGS. 5 and 6.

At block 1010, the configurator detects a denial-of-service attack by monitoring the served access point field. For example, as described above in relation to FIG. 7, the configurator 108 checks if the number of access points listed in the served access point field of the chirp table exceeds a set threshold number of access points. In a case that the number in the served access point field exceeds the threshold, the configurator determines that conditions exist on the network that are indicative of a DoS attack. In response to the detection, the configurator can notify a user of the potential DoS attack via a frontend dashboard system, such as that described in relation to FIG. 7.

Figure 11:
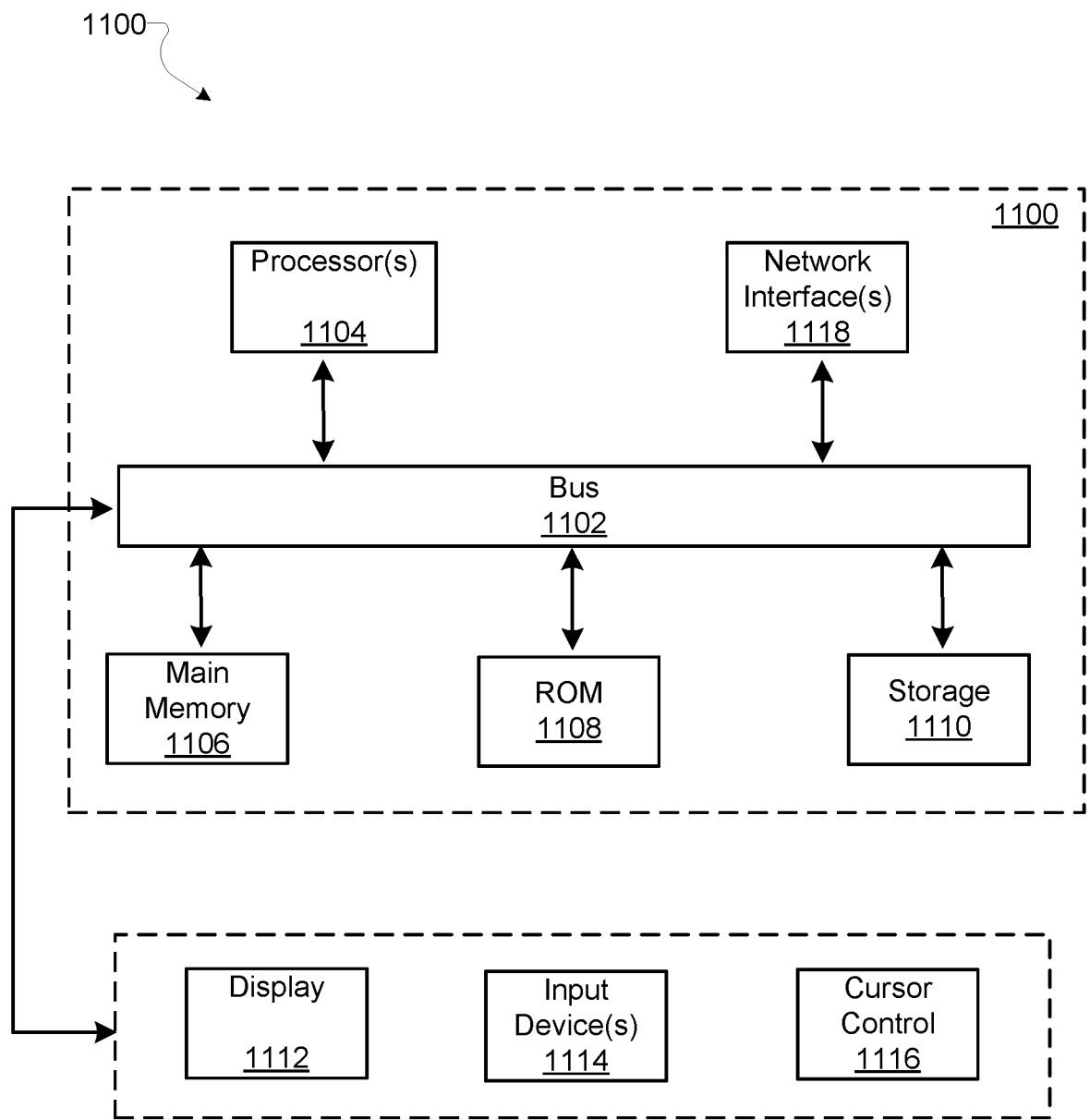
FIG. 11 is an example computer system that may be used to implement various features of DoS detection and mitigation of the present disclosure.

FIG. 11 depicts a block diagram of an example computer system 1100 in which various of the implementations described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors. The computer system 1100 may be implemented as one or more of IoT device 102, access points 106, configurator 108, authentication server 104, etc. of FIG. 1.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some implementations, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative implementations, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example implementations. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain implementations include, while other implementations do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
  receiving, by an access point (AP) from a configurator, a message indicative that the AP is provisioned for onboarding an internet-of-things (IoT) device, the message comprising a hash of data including a first public key of the IoT device and the message is received based on receipt of another message by the configurator from the AP or another AP responsive to the AP or the other AP receiving a chirp signal comprising the hash of data including the first public key of the IoT device;
  based on being provisioned for onboarding the IoT device, receiving, by the AP, verification of the first public key for the IoT device from an authentication server based on the hash of data including the first public key of the IoT device;
  generating, by the AP, a context based on the first public key, wherein the context comprises information for onboarding the IoT device on to a network without subsequent communications between the AP and the configurator and the AP and the authenticator; and
  transmitting, by the AP, an authentication request responsive to each of a first plurality chirp signals based on the context, the authorization request comprising the hash of the first public key;
  receiving, by the AP, a one or more chirp signals of the first plurality of chirp signals from a device other than the IoT device;
  receiving, by the AP, a chirp signal of the first plurality of chirp signals from the IoT device after receiving the first one or more chirp signals;
  receiving, by the AP, an authentication response from the IoT device based on an authorization request that is responsive to the chirp signal from the IoT device; and
  onboarding, by the AP, the IoT device onto the network based on the received authentication response.

2. The method of claim 1, further comprising:
  receiving, by the AP, an authentication response from the IoT device based on one of the authentication requests;
  receiving, by the AP, a second plurality of chirp signals after receiving the authentication response; and
  responsive to receiving the authentication response, ignoring the second plurality of chirp signals.

3. The method of claim 2, further comprising:
  onboarding, by the AP, the IoT device onto the network based on the received authentication response.

4. The method of claim 1, wherein generating the context by the AP is in response to receiving, by the AP, the verification of the first public key for the IoT device from the authentication server.

5. The method of claim 1, further comprising:
  receiving, by the AP, a chirp signal comprising the hash of data including the first public key of the IoT device from a device other than the IoT device; and responsive to receiving the chirp signal, reporting a chirping event to the configurator.

6. The method of claim 1, further comprising:
after a timeout period has elapsed:
- deleting the context;
- reporting a subsequent chirping event to the configurator responsive to receiving a subsequent chirp signal;
- receiving a chirping event reject message from the configurator; and
- in response to the chirping event reject message, generating another context based on the first public key, wherein the other context comprises information for onboarding the IoT device on to the network.

7. The method of claim 1, wherein the chirp signal and each of the a first plurality chirp signals are Device Provisioning Protocol (DPP) presence announcement messages.

8. The method of claim 1, wherein the first public key is a public bootstrapping key.

9. An access point, comprising:
a memory storing instructions; and
one or more processors communicatively coupled to the memory and configured to execute the instructions stored in the memory to:
- receive, from a device, a chirp signal comprising a hash of data including a first public key of an internet-of-things (IoT) device for onboarding the IoT device onto a network;
- based on receiving the chirp signal, receive verification of the first public key for the IoT device from an authentication server based on the hash of data including the first public key of the IoT device;
- generate a context based on the first public key, wherein the context comprises information for onboarding the IoT device on to the network without subsequent communications with the configurator and the authenticator; and
- transmit an authentication request responsive to each of a first plurality chirp signals based on the context, the authorization request comprising the hash of the first public key;
- receive a chirping event reject message from the configurator; and
- in response to the chirping event reject message, generate another context based on the first public key, wherein the other context comprises information for onboarding the IoT device on to a network.

10. The access point of claim 9, wherein the chirp signal and each of the a first plurality chirp signals are Device Provisioning Protocol (DPP) presence announcement messages.

11. The access point of claim 9, wherein the chirp signal is received from a device other than the IoT device.

12. The access point of claim 9, wherein the one or more processors are further configured to execute the instructions to:
- transmit a chirping event to a configurator in response to receiving the chirp signal; and
- based on a response to the chirping event received from the configurator, send a key authorization request to the authentication server,
- wherein the verification of the first public key of the IoT device from the authentication server is responsive to the key authorization request.

13. The access point of claim 9, wherein the one or more processors are further configured to execute the instructions to:
- receive an authentication response from the IoT device based on one of the authentication requests;
- receive a second plurality of chirp signals after receiving the authentication response; and
- responsive to receiving the authentication response, ignore the second plurality of chirp signals.

14. The access point of claim 9, wherein the one or more processors are further configured to execute the instructions to:
- onboard the IoT device onto the network based on the received authentication response.

15. The access point of claim 9, wherein the one or more processors are further configured to execute the instructions to:
- receive a one or more chirp signals of the first plurality of chirp signals from a device other than the IoT device;
- receive a chirp signal of the first plurality of chirp signals from the IoT device after receiving the first one or more chirp signals;
- receive an authentication response from the IoT device based on an authorization request that is responsive to the chirp signals from the IoT device; and
- onboard the IoT device onto the network based on the received authentication response.

16. The access point of claim 9, wherein generating the context is in response to receiving the verification of the first public key for the IoT device from the authentication server.

* * * * *